US010876709B2

(12) United States Patent
Haigh

(10) Patent No.: US 10,876,709 B2
(45) Date of Patent: Dec. 29, 2020

(54) LIGHTING DEVICE WITH LIGHT CONDUCTOR AND SPHERICALLY CURVED, ROTATABLE LENS/REFLECTOR UNIT WITH ADJUSTABLE FOCUS

(71) Applicant: Colordyne Limited, London (GB)

(72) Inventor: Neil Haigh, Preston (GB)

(73) Assignee: COLORDYNE LIMITED, London (GB)

( * ) Notice: Subject to any disclaimer, the term of this patent is extended or adjusted under 35 U.S.C. 154(b) by 96 days.

(21) Appl. No.: 15/999,003

(22) PCT Filed: Feb. 15, 2017

(86) PCT No.: PCT/GB2017/050393
§ 371 (c)(1),
(2) Date: Aug. 20, 2018

(87) PCT Pub. No.: WO2017/141028
PCT Pub. Date: Aug. 24, 2017

(65) Prior Publication Data
US 2019/0078758 A1  Mar. 14, 2019

(30) Foreign Application Priority Data

Feb. 18, 2016 (GB) .................................. 1602836.7

(51) Int. Cl.
*F21V 7/00* (2006.01)
*F21S 8/06* (2006.01)
(Continued)

(52) U.S. Cl.
CPC .............. *F21V 7/0008* (2013.01); *F21S 8/06* (2013.01); *F21V 5/041* (2013.01); *F21V 13/04* (2013.01);
(Continued)

(58) Field of Classification Search
CPC ........ F21V 7/0008; F21V 13/04; F21V 14/04; F21V 14/06; F21V 5/046; F21V 14/02; F21V 5/041
See application file for complete search history.

(56) References Cited

U.S. PATENT DOCUMENTS

| 5,988,841 | A | 11/1999 | Simon |
| 6,045,250 | A | 4/2000 | Simon |
| 6,183,120 | B1 | 2/2001 | Simon |
| 8,899,783 | B1 | 12/2014 | Simon |
| 2006/0002136 | A1 | 1/2006 | Buelow |
| 2008/0232107 | A1 | 9/2008 | Hsu |

FOREIGN PATENT DOCUMENTS

| EP | 2068179 A1 | 10/2009 |
| ES | 2181551 A1 | 2/2003 |

(Continued)

OTHER PUBLICATIONS

International Search Report for corresponding application PCT/GB2017/050393 filed Feb. 15, 2017; dated Apr. 5, 2017.

(Continued)

*Primary Examiner* — Joseph L Williams
(74) *Attorney, Agent, or Firm* — Cantor Colburn LLP

(57) ABSTRACT

A lighting device includes a light emitter with a spherical translucent body containing at least one reflector and defining large, combined incident and emission lenses, where the light emitter reflects and focuses light from a waveguide to project a beam onto a target surface, the light emitter is preferably slidably mounted for rotation on a support element which may include a circular aperture in a plate, and may be configured as a desk or stage lamp, a wall light, or a downlighter suspended beneath a ceiling, such that waveguide or light emitter may provide ambient or uplighting in addition to the beam.

16 Claims, 17 Drawing Sheets

(51) Int. Cl.
*F21V 13/04* (2006.01)
*F21V 14/04* (2006.01)
*F21V 14/06* (2006.01)
*F21V 8/00* (2006.01)
*F21V 5/04* (2006.01)
*F21V 14/02* (2006.01)
*F21Y 115/10* (2016.01)
*F21S 6/00* (2006.01)
*F21S 8/02* (2006.01)

(52) U.S. Cl.
CPC .............. *F21V 14/02* (2013.01); *F21V 14/04* (2013.01); *F21V 14/06* (2013.01); *G02B 6/0008* (2013.01); *F21S 6/002* (2013.01); *F21S 6/004* (2013.01); *F21S 8/026* (2013.01); *F21Y 2115/10* (2016.08)

(56) References Cited

FOREIGN PATENT DOCUMENTS

| | | |
|---|---|---|
| FR | 2542063 A1 | 9/1984 |
| FR | 2683618 A1 | 5/1993 |
| JP | 2012069370 A | 4/2012 |
| WO | 9416265 A1 | 7/1994 |

OTHER PUBLICATIONS

Written Opinion of the International Searching Authority for corresponding application PCT/GB2017/050393 filed Feb. 15, 2017; dated Apr. 5, 2017.
British Search Report for corresponding application GB1602836.7 Report dated Jul. 12, 2016.

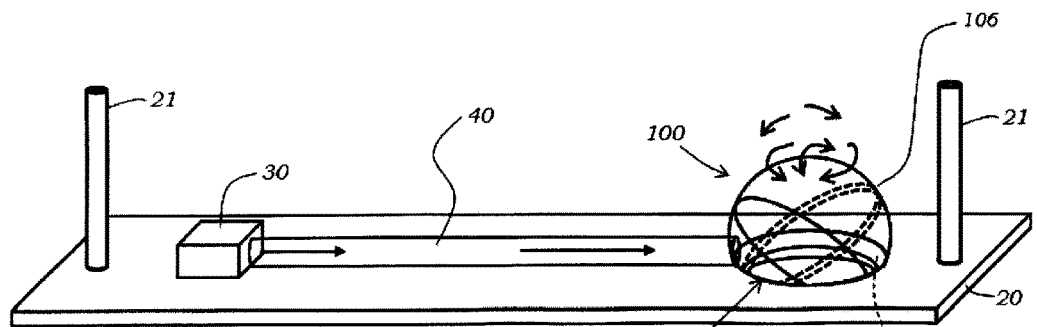
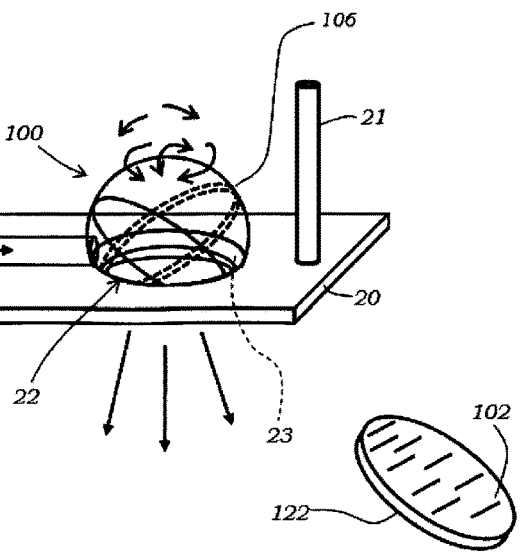
Fig. 1A
Fig. 1B
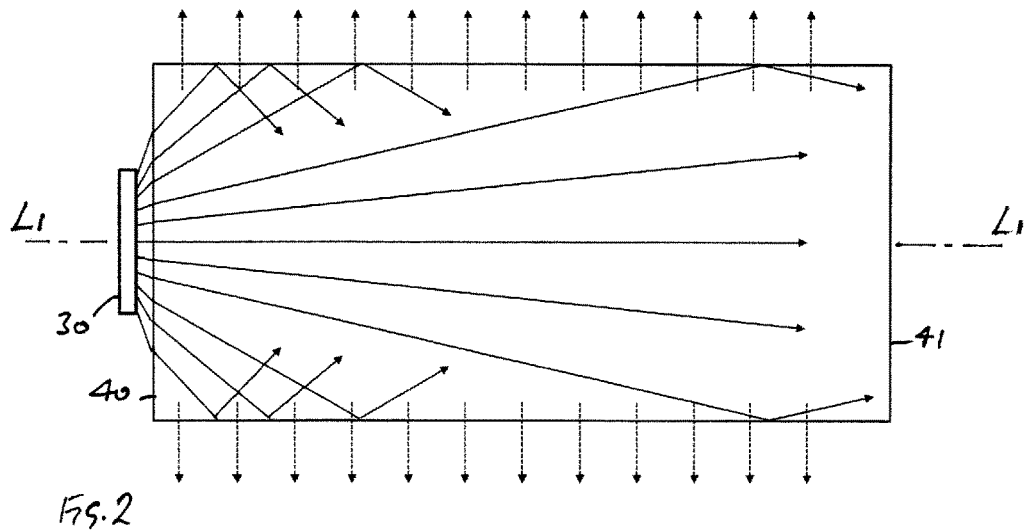
FIG. 2
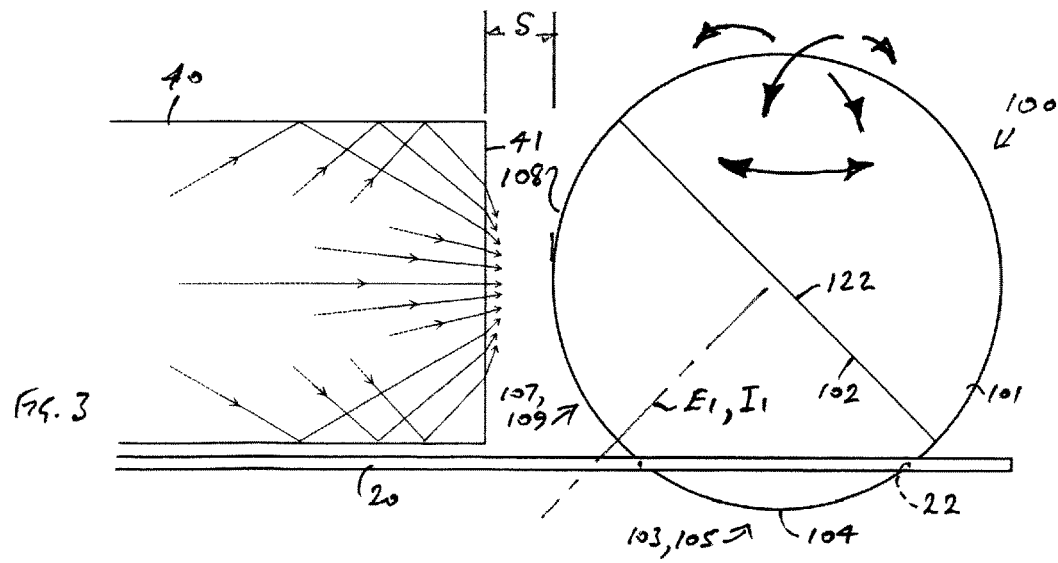
FIG. 3

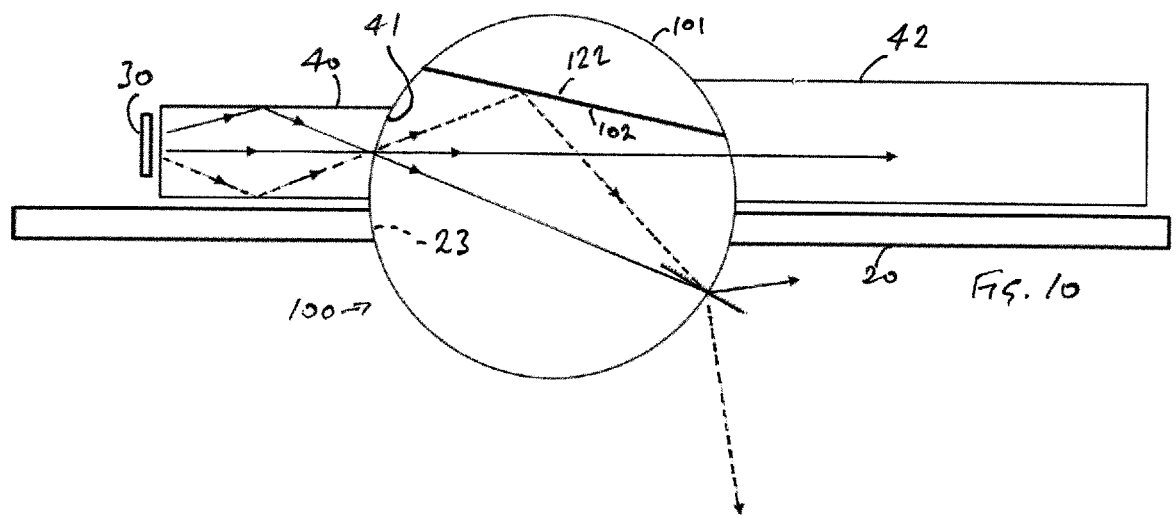
FIG. 10
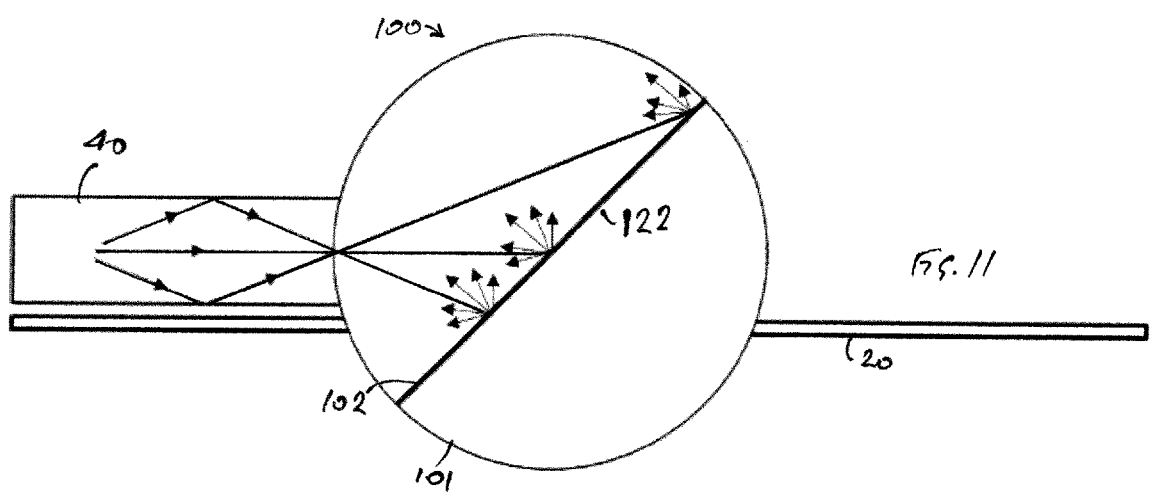
FIG. 11
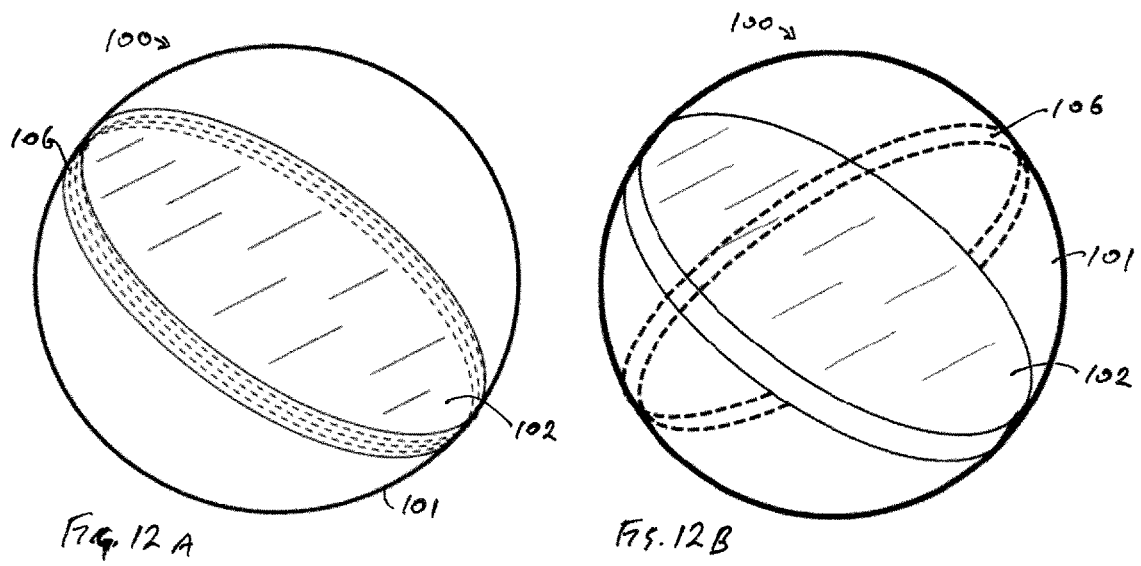
FIG. 12A
FIG. 12B

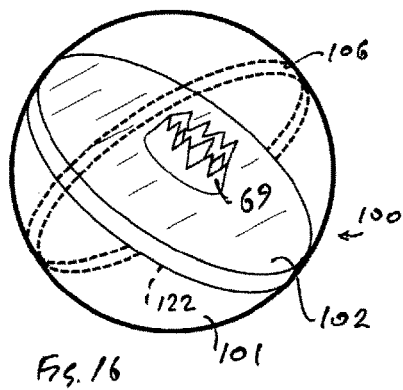
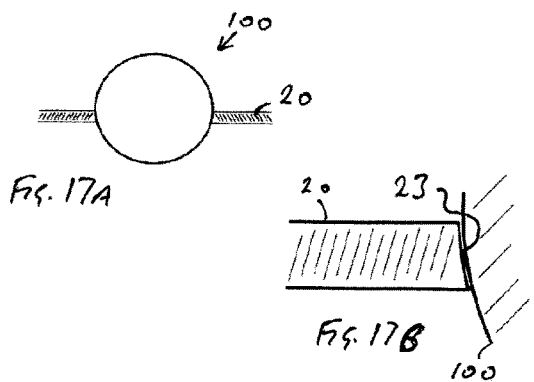
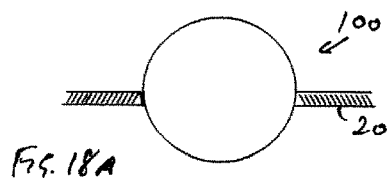
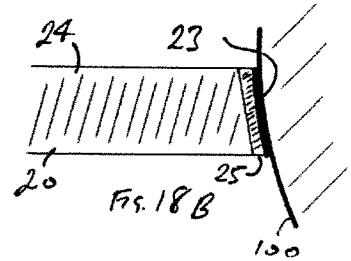
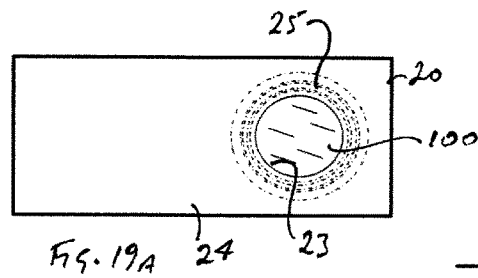
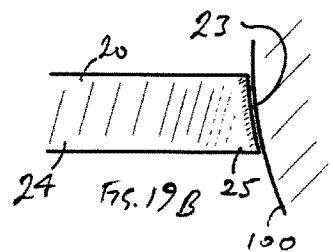
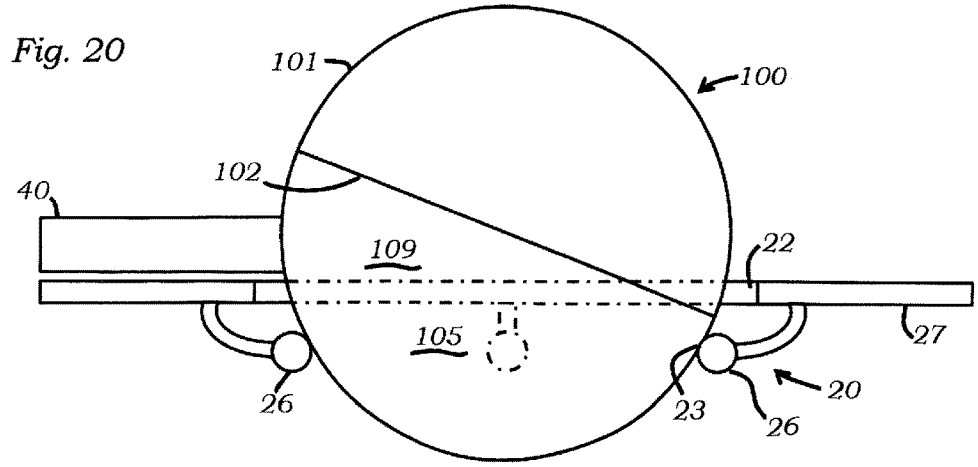

LIGHTING DEVICE WITH LIGHT CONDUCTOR AND SPHERICALLY CURVED, ROTATABLE LENS/REFLECTOR UNIT WITH ADJUSTABLE FOCUS

This invention relates to lighting devices, and particularly to lighting devices which produce a beam of light which may be directed to illuminate a target such as a book on a workdesk or a performer on a stage.

US2008232107 teaches a lighting device in which an LED light source illuminates two light guides with reflectors, one of the light guides being pivotable to change from ambient to task lighting.

FR2683618 teaches a lighting device comprising a reflector pivotably mounted on top of a vertical tubular light conductor.

U.S. Pat. No. 8,899,783B1 teaches an LED light bulb comprising a reflector and other components rotatably mounted inside a translucent casing.

U.S. Pat. No. 6,183,120 discloses a lighting device comprising an internally reflective tube which conducts light to a rotating, translucent sphere containing a rotating reflector.

U.S. Pat. No. 5,988,841 discloses a lighting device comprising a waveguide which conducts light to a rotating light distribution means.

U.S. Pat. No. 6,045,250 discloses a lighting device in which a spherical shell containing a reflector is mounted for rotation in a hole in a ceiling panel.

Lighting devices which are adjustable to direct the beam, exemplified by those described above, are often mechanically complex with intricate moving parts which can be difficult to assemble or adjust. Many do not produce a well defined beam with uniform light intensity, so that they may be used for background or feature lighting rather than for illuminating a work desk or other target plane. The mechanical parts of such devices can also be difficult to clean, so that their performance is gradually impaired by the accumulation of dust. It is also difficult to incorporate other functionality such as light detection or image projection into such devices.

A further problem with lighting devices having LEDs or other point light sources is that the light source may dazzle the viewer and leave a retinal image if it is viewed directly or via a specular reflector or lens. A Lambertian reflector or a diffuser can provide more even illumination but tends to reduce light output and hence energy efficiency.

It is a general object of the present invention to provide a lighting device which offers an improvement in terms of at least some of the abovementioned problems and which produces a beam of light which can be directed to illuminate a target.

Accordingly the present invention provides a lighting device as defined in the claims.

The novel lighting device includes at least one light emitter, at least one light source, and at least one light conductor arranged to conduct light from the light source to the light emitter. The light emitter includes a translucent body and a first reflector which is connected to or integral with the translucent body. The translucent body includes at least a first emitter portion which is shaped to define a first emitter lens. The first reflector is arranged to reflect light emitted from the light conductor to exit the light emitter as a beam of light via the first emitter lens, and the light emitter is rotatable with at least one degree of freedom relative to the light conductor to direct the beam.

Further more specific objectives, features and advantages will become apparent from the various illustrative embodiments of the invention which will now be described, purely by way of example and without limitation to the scope of the claims, and with reference to the accompanying drawings, in which:

FIG. 1 shows a downlighter comprising a spherical light emitter mounted in a horizontal plate;

FIG. 2 illustrates the ray paths in a light conductor comprising a solid refractive optical waveguide;

FIG. 3 shows a lighting device incorporating the waveguide of FIG. 2 spaced apart from a spherical light emitter;

FIG. 10 shows a downlighter similar to that of FIG. 9 and incorporating an additional light conductor;

FIG. 11 shows a downlighter with a double sided reflector adjusted to uplighting mode;

FIGS. 12A and 12B show a spherical light emitter with a knurled surface region extending respectively in the plane of the reflector (FIG. 12A) and in a plane which is angled with respect to the reflector (FIG. 12B);

FIG. 16 shows a spherical light emitter with a scattering element;

FIG. 17A is a side view of a downlighter in which the spherical light emitter is slidably mounted in a circular hole in a horizontal support plate;

FIG. 17B is an enlarged view of part of FIG. 17A;

FIG. 18A is a side view of another downlighter similar to that of FIG. 17A, in which the periphery of the hole is formed by a felt cushion;

FIG. 18B is an enlarged view of part of FIG. 18A;

FIG. 19A is a top view of a downlighter similar to that of FIG. 17A, in which the periphery of the hole is formed by an elastomeric material;

FIG. 19B is an enlarged view of part of FIG. 19A;

FIGS. 20 and 21 are respectively a side view and top view of a downlighter comprising a spherical light emitter mounted on bearings in a circular hole in a horizontal support plate;

Reference numerals occurring in more than one of the figures indicate the same or corresponding elements in each of them.

Figure 4:
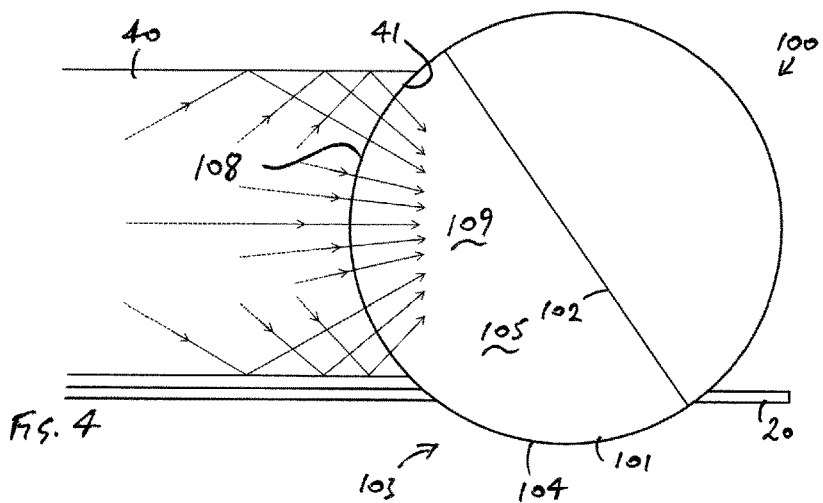
FIG. 4 shows another lighting device incorporating the waveguide of FIG. 2 arranged in contact with a spherical light emitter.

In this specification, a three dimensional surface is considered to have spherical curvature if it could be extended to form a sphere, and the origin of the curved surface is the point at which its radii intersect and which would be the centre of the sphere.

In this specification, the term translucent is taken to include transparent. The translucent body of the or each light emitter is advantageously transparent, as are the light conductors and other translucent elements such as bearing materials, but any or all of them could alternatively be translucent but not transparent, e.g. diffusive, as required for the particular application.

The novel lighting device can be arranged in various configurations to define for example a ceiling mounted downlighter, a wall lamp, a desk lamp or standard lamp, a street lamp, or a stage light for use in illuminating a performer.

FIG. 1 shows how a light emitter 100 can be supported by a support element 20 configured as a flat plate with fixing means 21 for fixing it in a use position in spaced relation to a support surface. The plate may be arranged horizontally so that the lighting device can be used as a downlighter beneath a ceiling or other horizontal surface.

The fixing means may be configured to suspend the lighting device from the support surface so that it can be used without any suspended ceiling system. Alternatively of course the fixing means may be arranged to support the lighting device in a framework so that the support plate forms a tile in a suspended ceiling system.

In addition to the light emitter 100 and support element 20, the lighting device includes a light source 30, which may comprise a single LED or other light generating device or an array of several such devices, and a light conductor 40 which is arranged to conduct light from the light source to the light emitter. Optionally, in this and other embodiments, a controlled proportion of the transmitted light may be emitted from local discontinuities in the body or outer surface of the light conductor 40 to provide ambient illumination of a ceiling or reflector above the suspended device.

Figure 6:
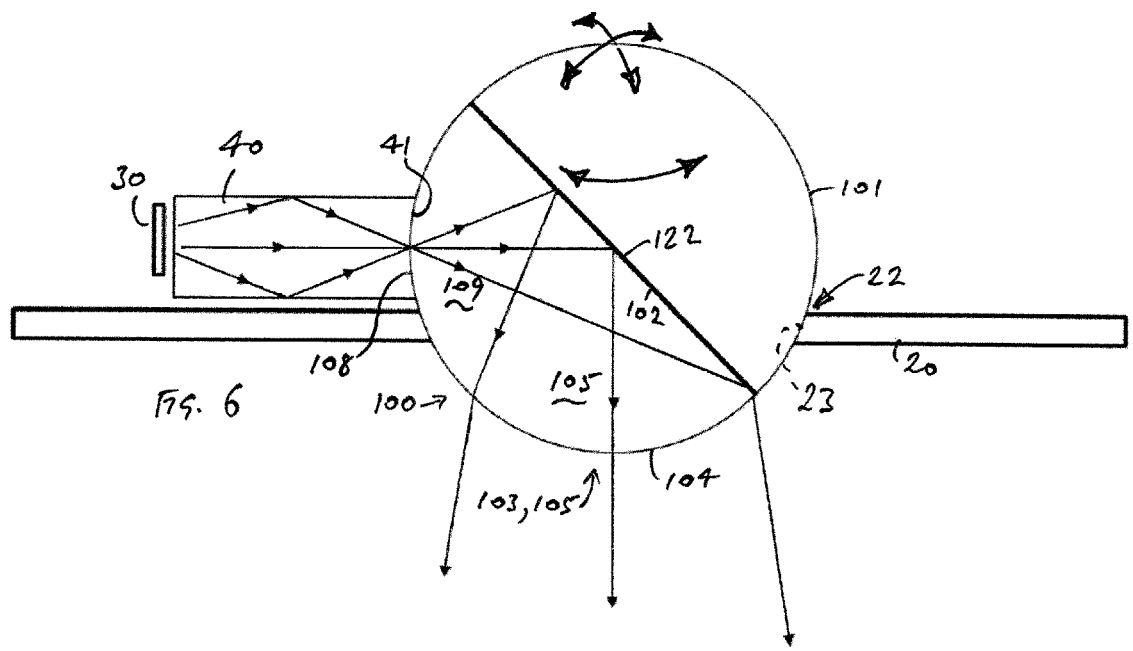
FIG. 6 shows another downlighter in which the light conductor is arranged in contact with the light emitter.

The light emitter includes a translucent body 101 and a first reflector 102 which is connected to or integral with the translucent body. As best seen in FIGS. 3, 4 and 6, the translucent body includes at least a first emitter portion 103 defining a first emitter surface 104 which is shaped to define a first emitter lens 105. The first reflector 102 is arranged to reflect light emitted from the light conductor 40 to exit the light emitter as a beam of light via the first emitter lens 105, and the light emitter is rotatable with at least one degree of freedom relative to the light conductor 40 and support element 20 to direct the beam.

The translucent body 101 of the light emitter may be a solid, translucent glass or plastic sphere, variously referred to hereinafter as a ball optic, which contains the first reflector 102. The reflector can be a flat mirror or other reflective element embedded in the ball optic, for example, a disc (as shown in FIG. 1B) which is arranged between the opposed flat surfaces of two generally hemispheric portions of the optic, or it could be the reflective surface of an optical discontinuity such as a slot formed in the optic.

In this and other embodiments, the light emitter may include at least one second reflector 122, as further described below and particularly with reference to FIGS. 38A and 38B. Where the light emitter includes more than one reflector, the reflectors may be positioned differently with respect to the centre of rotation of the light emitter or the central axis of the light conductor, or may have different characteristics. For example, each reflector may be flat or curved, and parallel or nonparallel. For example, one reflector could be flat and the other curved. The reflectors may be arranged so that the light emitter can be rotated to reflect the light from the light conductor selectively from one or other of them, or simultaneously from both or all of them. Each reflector may be specular or diffuse or Lambertian. By providing reflectors with different characteristics, the user may rotate the light emitter for example to obtain a broad, diffuse beam or a concentrated spot. The translucent body 101 of the light emitter may similarly include different regions; for example, it may be partially transparent and partially non-transparent or diffusive, or it may include void spaces, liquid filled spaces, or internal lenses to modify the light reflected from one or other of the reflectors.

The spherical light emitter 100 is mounted for rotation in a circular hole 22 in the support element, and a textured surface region configured as a knurled ring 106 is provided on its surface so that the ball optic can be engaged and rotated with one finger, as further described below.

In this and other embodiments, the light conductor 40 may be a hollow tube, preferably with a reflective inner surface and, optionally, beam transfer lenses spaced apart along its length. More preferably however the light conductor is a body of solid translucent material which functions as an optical waveguide to conduct light by total internal reflection. The waveguide may be a parallel sided rod or tube with a circular, elliptical, polygonal or other non-circular cross section, or a flat or curved sheet, made for example of glass, acrylic or other suitable plastics material. In each case, the light conductor may function as a support element to support the light emitter as it is rotated by the user, or a separate support element may be provided as exemplified by the embodiment of FIG. 1.

FIG. 2 illustrates how the LED or other light source 30 launches light into the light conductor 40 comprising a solid optically refractive waveguide rod, made for example from glass or acrylic. Light is captured within the waveguide via Fresnel refraction; as appropriate the endface of the rod at the location of launching may be shaped or curved i.e. other than a planar endface, to achieve certain guidance conditions that may be needed for the lighting task. Optionally, an additional coupling optic (not shown) might be used between the light source and the waveguide to form the desired family of rays within the waveguide and to maximise coupling of light into the system. In these regards it can be understood that establishing a certain family of guided rays within a waveguide lighting system may be desirable in order to achieve a specific objective for the lighting system such as for example, good uniformity of projected illuminance in the task plane. For example, it may be desirable to achieve a family of rays that are all guided at low angles to the optical axis with no extremal rays propagating at high angles to the axis, alternatively it may be desirable to exclude the presence of rays guided at low angles and establish rays at a high angle etc.; the choice of guided ray family will depend upon the specific lighting task and aesthetic to be achieved by the lighting system, and may be determined for example by a ray trace optimisation procedure.

FIG. 2 also illustrates how the waveguide may optionally be configured to scatter some of the light from internal and surface discontinuities so that the scattered fraction leaks out from the sides of the waveguide to provide weak ambient lighting as further described below.

Preferably, all or most of the light emitted by the light source 30 is coupled into the waveguide as known in the art to form a well-defined family of rays which are guided by refraction and total internal reflection, which for acrylic and glass is typically within a cone angle of about 50 degrees centred on the length axis L1 of the waveguide, so that rays outside the desired angular range are not conducted to the light emitter 100. It should be noted that depending on the specific nature of the optical launch into the waveguide it is possible either to establish and maintain a specific family of guided light rays, or instead to scramble the ray paths within the guide, according to the lighting effect to be achieved.

For example, random mixing of the rays propagating in the guide may advantageously prevent the light source 30 from being imaged when observed from within the beam leaving the light emitter, so that LEDs or other point light sources can be used without dazzling or causing a persistent retinal image. As an example, such random mixing might be achieved by applying a diffuse surface finish to the launch end of the waveguide rod.

Alternatively, and in the absence of a diffusing structure within the launch, it is possible to establish and maintain a fixed set of ray paths in the guide that can usefully convey desired features from the light source (such as the light output from individual LED dies) to the distal end of the waveguide rod. As an example of the latter scenario using well defined ray paths, there may be a desire to deliver an aesthetically pleasing pattern of light from the light source 30 to the task plane.

Referring to FIG. 3, in these and other embodiments, the first emitter lens 105 is preferably convexly curved without inflections to define a central optical axis, referred to as the first emitter axis E1. The first emitter lens preferably extends over at least most of a total section area of the light emitter normal to the first emitter axis E1 when viewed along the first emitter axis. In FIG. 3 it can be seen that the first reflector occupies the total section area of the light emitter when viewed along the first emitter axis. Most preferably, the emission surface defining the first emitter lens is spherically curved, as shown.

Preferably the translucent body also includes a first incident portion 107 which is arranged to conduct light emitted from the light conductor to the first reflector. Preferably the incident surface 108 of the first incident portion is shaped to define a first incident lens 109, so that the light incident on the first incident surface is focused by the first incident lens before being reflected and then focused again by the first emitter lens before it is emitted as a beam from the first emitter surface.

Preferably as shown in the example of FIG. 3, the incident surface defining the first incident lens is convexly curved without inflections and defines a central optical axis, referred to as the first incident axis I1, and the first incident lens extends over at least most of a total section area of the light emitter normal to the first incident axis I1 when viewed along the first incident axis. Preferably the first incident lens is spherically curved, as shown.

As exemplified by the embodiment of FIG. 3, the first emitter and incident portions and first emitter and incident lenses may be combined so that they have a common axis E1, I1. The light emitter is rotationally adjustable with preferably two or three degrees of freedom relative to the support element 20 and light conductor 40 as indicated by the curved arrows, so that different parts of the combined, spherical emitter and incident surfaces will receive light from the light conductor and emit light through the circular hole 22 in the support element, depending on the rotational position of the light emitter 100.

Preferably the first emitter portion 103 is a solid region of the translucent body 101 of the light emitter which extends between its first emitter surface 104 and the first reflector 102, and the first incident portion 107 is a solid region of the translucent body 101 of the light emitter which extends between its incident surface 108 and the first reflector 102. The respective portions thus define two large incident and emitter lenses which by virtue of their curvature and the refractive index of the material of the translucent body (typically glass, acrylic or other plastics material) bring into play a wide range of refractive optical effects depending upon how refraction is managed through the optical system. Notably, the lens like functioning of the Incident and emitter lens structures can be used to determine the size of the exit beam cone of light; for example, reducing the radius of curvature of the emitter surface yields increasingly wider exit beam cones compared to using a larger radius of curvature.

Furthermore, by spacing the incident surface 108 apart from the emission surface (end face) 41 of the waveguide light conductor 40 by a separation distance S, it is possible to project a sharply defined pool of light onto the target surface, wherein the separation distance S is selected according to the distance between the light emitter 100 and the target plane so that the large incident and emitter lenses form a conjugate imaging system with the emission surface 41 as its object plane. The cross sectional shape of the waveguide light conductor 40 may be selected to define a suitably shaped beam so that the pool of light is for example circular or rectangular as required for the application, e.g. to illuminate a rectangular desk surface or a rectangular surface for use as a ball game court. As further explained below, the same system may be adapted to project an image from the object plane onto the target plane.

At the same time, by making the incident and first emitter surfaces smooth and with uniform, preferably spherical curvature, it is possible to angularly adjust the beam by rotating the light emitter (including its integral reflector) relative to the light conductor 40, without altering the focus of the beam or other optical parameters of the system as the beam traverses different regions of the first emitter and incident portions of the translucent body 101. Moreover, the light emitter can slide smoothly on its support element 20 during adjustment so as to maintain a constant separation distance 5, as discussed in more detail below.

When illuminated by the family of rays emitted from the end of the waveguide, which may be randomly mixed within the waveguide and which are confined by conduction through the waveguide within a well defined angular envelope, the light emitter can thus generate a well defined beam of the desired cone angle, for example, about 45 degrees, and with even intensity throughout its cross section and sharp cut-off at its edges.

Preferably as exemplified in the embodiments of FIGS. 1 and 3, the lighting device includes a support element 20, and the first incident lens is slidably mounted on a contact surface of the support element to support the light emitter in rotation with at least two degrees of freedom relative to the support element. The curved arrows in FIG. 1 and FIG. 3 show that in these and other embodiments the spherical light emitter can have three degrees of rotational freedom relative to the light conductor and support element.

As illustrated in the example of FIG. 1, in these and other embodiments, the support element 20 may be arranged for example as a plate or sheet to define a circular aperture 22, and the light emitter mounted for rotation in the aperture so that one or both of the spherically curved incident and emitter surfaces 108 or 104 slidingly engages the support element at the periphery of the aperture. This allows adjustment of the light emitter with three degrees of freedom relative to the light conductor—which is to say, the spherically curved surface of rotation can be rotated in any desired direction of rotation about its origin while remaining in sliding contact with the support element.

By arranging the light emitter in sliding contact with the support element, a self adjusting connection is provided which provides fingertip adjustment with two degrees of freedom and substantially without lost motion and which automatically compensates for wear by maintaining a constant frictional Contact between the emitter 100 and the contact surface 23 of the support element, for example, by gravity as in the illustrated examples, or by a resilient bias mechanism (not shown). The emitter 100 is securely retained (preferably being larger than the aperture 22 in the support element) and can be adjusted more precisely than prior art bendable or articulated connections which loosen with age or suffer from lost motion or mechanical lag which causes them to wander from the desired position. Of course, no electrical connection is required to the light emitter 100, so that the resulting assembly is mechanically simple and robust.

Further advantageously, the sliding interface between the incident surface of the light emitter and the contact surface 23 of the support element also provides a self cleaning action which wipes dirt from the incident surface every time the light emitter is adjusted. A similar sliding interface could be arranged if desired to clean the emission surface.

Advantageously, in these and other embodiments, the origin of the spherically curved incident surface may lie at the origin of the spherically curved emission surface. Further advantageously, the origin of one or both surfaces may lie on the first reflector, preferably in the centre of the first reflector, and on the central length axis L1 of the light conductor. This makes it possible to maintain the centre of the reflector in constant alignment with the light conductor and to provide a constant focusing power as the light emitter is rotated.

FIG. 3 illustrates how the light conductor may be spaced apart from the incident surface of the light emitter or ball optic 100 by a gap, typically an air gap. The manner in which waveguided light exits the waveguide and is transferred towards the ball optic is dependent upon the curvature of the end face 41 of the waveguide 40, the refractive index of the medium into which the rays exit directly, and the separation distance (if any) between the end of the waveguide and the ball optic.

The arrows illustrate the ray paths of waveguided light exiting from the planar end face 41 of the optical waveguide 40. For a situation of a lower refractive index medium such as air lying in the gap region, the rays may undergo further refraction as they exit the waveguide medium. Such further refraction of the exiting light can in turn impact upon how much light is coupled into the ball optic 100. For example, some strongly refracted light might miss the ball optic if the exit angle of the rays is too high. There may also be a certain amount of Fresnel back-reflection of light for the rays striking the end face 41 of the waveguide 40 due to a difference in refractive index between the waveguide and the air or other medium air in the gap. Refraction can also affect the nature of the pattern of light (or family of rays) exiting the ball optic 100 and directed towards the task plane. For example, in certain circumstances the ball optic can be arranged to form an image of the exit face of the waveguide, which may be advantageous for illumination or signalling purposes, as further described below.

For all these reasons, the waveguide end face curvature, refractive index difference between adjacent optical media, and separation distance between waveguide endface and ball optic may all be controlled to obtain the desired ray exit parameters at the distal end face 41 of the waveguide to suit particular applications.

Referring to FIG. 4, in contrast to the FIG. 3 arrangement, the curvature of the incident surface 108 of the light emitter 100 makes it possible for the incident surface to be arranged alternatively in sliding contact with the whole end face (i.e. the whole light emission surface) 41 of the waveguide 40 forming the light conductor. The curvature of the light emitter matches that of the waveguide so that Fresnel reflection resulting in leakage of light and glare at the sliding interface is minimised or eliminated.

The arrows show how ray paths exit the refractive optical waveguide into the index matched translucent body of the light emitter.

Optionally, a translucent bearing material may be arranged at the sliding interface to provide more intimate mechanical contact between the light emitter and the waveguide material, as further described below.

In the illustrated example, the refractive index values of the waveguide 40 and ball optic 100 are matched so that the rays do not undergo Fresnel refraction at the interface between the two media.

In other applications, the relative refractive indices may be unmatched. For example, the waveguide 40 may be fabricated from acrylic with a refractive index in the region of 1.5 and the ball optic 100 may be fabricated from cubic zirconia with a refractive index in the region of 2.2, enabling the ball optic to introduce refractive effects whilst maintaining physical contact between the two media.

Figure 5:
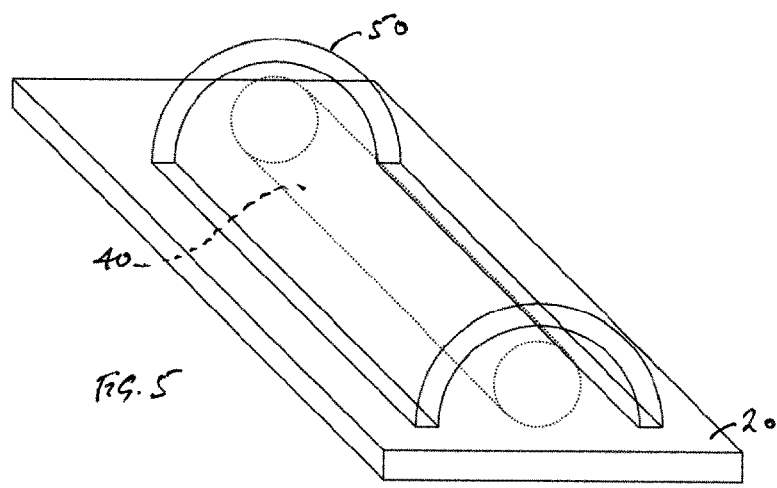
FIG. 5 shows another lighting device in which a shell is arranged around the light conductor.

Referring to FIG. 5, the light conductor 40 comprising a solid waveguide may be enclosed in an outer shell 50 affixed to the flat sheet which forms a support element 20. The shell 50 can be opaque (e.g. made from copper, chrome, or opaque acrylic) to capture any light leaking from the waveguide 40 and to protect its surface from dust and other contamination. Alternatively, the outer shell 50 may be translucent, for example, made from a tinted acrylic to provide uplighting to the ceiling.

FIG. 6 illustrates how the spherical light emitter 100 may be rotated with three degrees of freedom while remaining in sliding contact with the waveguide light conductor 40. The incident and emitter lenses focus the beam so that it can be used as a spotlight which is directed to the target plane by rotating the light emitter.

Figure 7:
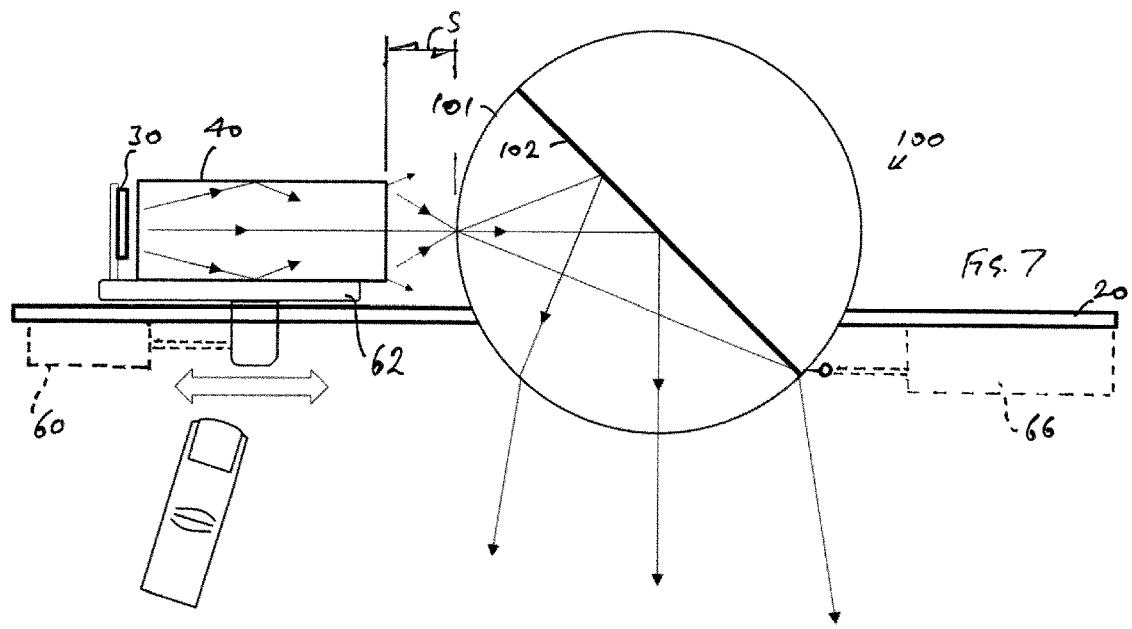
FIG. 7 shows another downlighter in which the light conductor is spaced apart from the light emitter.

FIG. 7 illustrates how the waveguide rod comprising the light conductor 40 and the ball optic 100 can be separated by an adjustable separation distance. The light source 30 and light conductor 40 are mounted together on a moveable chassis support 62 that forms an adjustment means, with a handle that can be manually adjusted backwards and forwards to vary the separation distance between the end (emission) surface of the waveguide rod and the incident surface of the ball optic. This makes it possible to adjust the size of the conical beam of light exiting the ball optic, for example, to create a variable size spot of light on a target plane.

Optionally, in this and other embodiments, instead of a manual adjustment means, a motorised actuator 60 may be provided for remotely adjusting the separation distance.

The embodiment of FIG. 7 also illustrates how a powered, e.g. motorised actuator 66 can be provided for rotating the light emitter relative to the light conductor. In this way for example the light emitter may be configured as an elevated stage light with the light source being positioned at a lower level and connected to the light emitter via a vertical or inclined light conductor, and remotely controlled to direct the beam.

Figure 8:
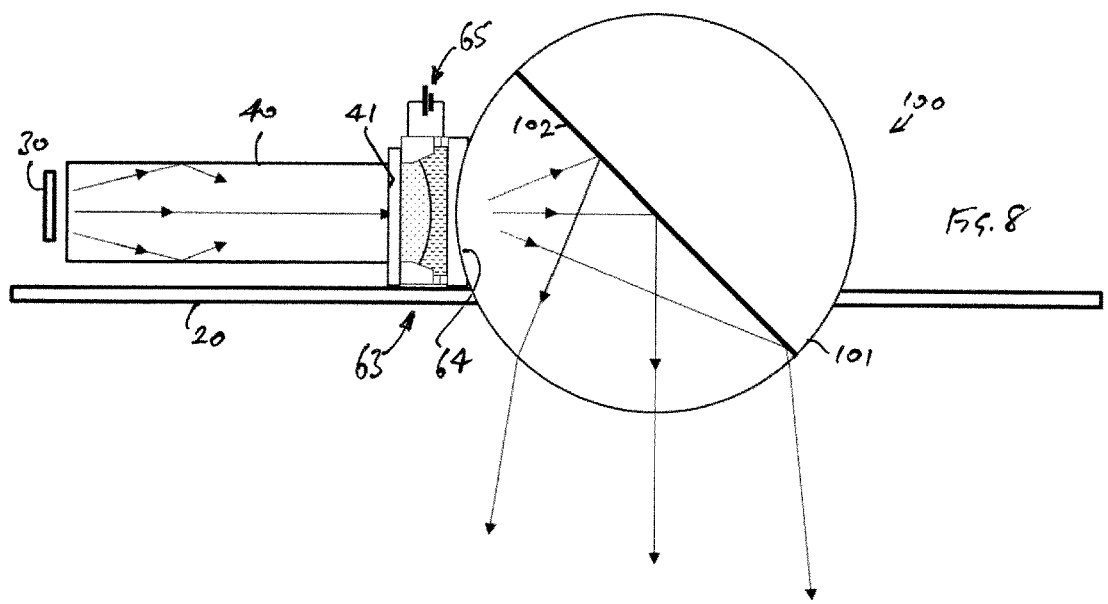
FIG. 8 shows another downlighter in which an adjustable focus lens is arranged between the light conductor and the light emitter.

FIG. 8 shows how an autofocus mechanism can allow the ball optic and waveguide rod to remain in physical contact with each other while allowing the refraction of light between the waveguide and ball optic to be adjusted. In the example illustrated, a variable focus liquid lens 63 (as taught for example in EP1674892 and other patents to Varioptic SA) is placed between the waveguide and the incident surface of the ball optic 100. It can be seen that the exit window 64 of the liquid lens chamber has a radius of curvature that matches that of the ball optic. The focal length of the liquid lens can be altered by changing the relative curvature of the surface of an oil droplet inside the chamber by means of a variably applied voltage from a voltage source 65, allowing remote control via a low current wire connection, for example, in stage lighting applications where it is desired to minimise weight and mechanical complexity in the elevated light emitter.

This system allows for the size of the cone of light leaving the optical system to be adjusted automatically without the need to physically translate the waveguide end face 41 relative to the ball optic 100. This can be used to change the spot size on the target plane, for example, where the lighting device is configured as a reading light or to illuminate an artwork in a museum or gallery.

Other variable focus optical elements nay be used instead of a liquid lens. For example, a so-called "solid tuneable lens" could be used, comprising a pair of translucent plates with opposed, equally and oppositely curved surfaces, as disclosed by Yongchao Zou, Wei Zhang, Fook Siong Chau, and Guangya Zhou, "Miniature adjustable-focus endoscope with a solid electrically tunable lens," Opt. Express 23, 20582-20592 (2015).

When the plates are perfectly aligned, they behave as one unit without any focusing power—any wave phase shift induced by one plate is cancelled out by the other. However, when the plates are slightly offset to each other in a transverse direction (across the optical axis) the overall refractive effect of free form surfaces is to refract light like a traditional lens. The advantage of the solid tuneable lens is that the means of adjustment does not necessarily require an electrical supply and so that entire optical system can be passive (i.e. no electricity required) other than at the location of the light source.

In the above illustrated embodiments, the first reflector lies in an equatorial plane, i.e. a plane containing the centre of the spherical light emitter 100, and the central length axis L1 of the waveguide is aligned with the centre of the spherical light emitter.

Figure 22:
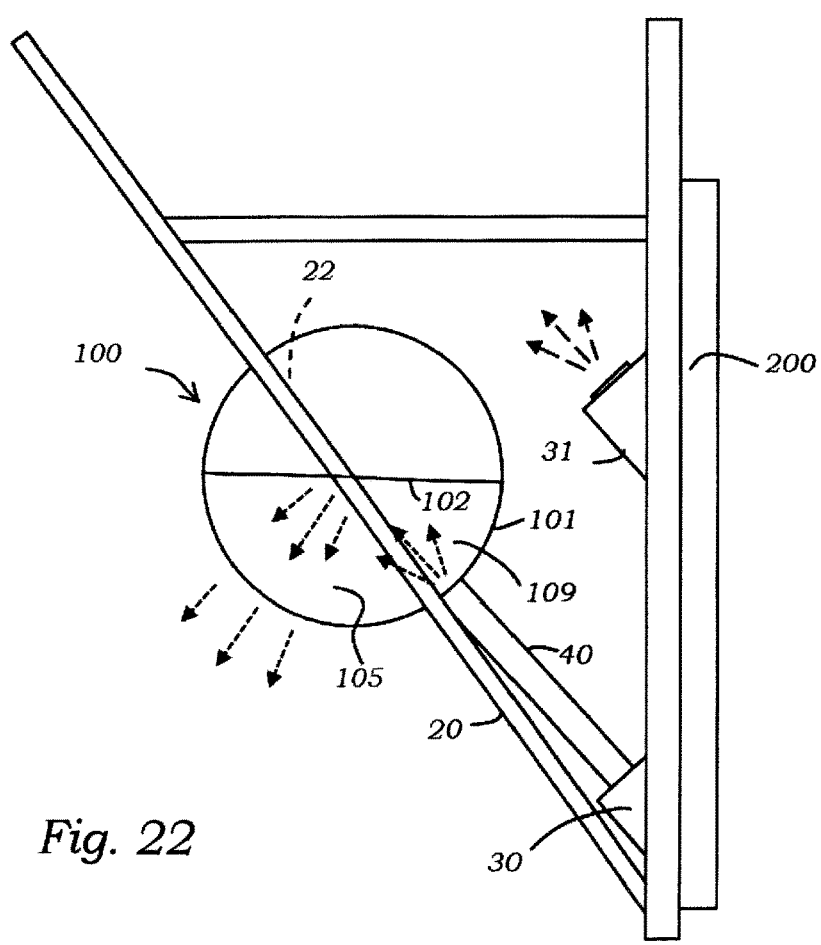
FIG. 22 shows a wall light comprising a spherical light emitter mounted in a support plate.

Optionally in these and other embodiments, the first reflector may be arranged to reflect a first portion of the light emitted from the light conductor in a first direction to form the beam, and to allow a second portion of the light emitted from the light conductor to travel past or through the reflector in a second direction to form a second beam. Optionally, in a use position, the first beam may be directed generally downwardly and the second beam generally upwardly, for example, by arranging the waveguide obliquely as illustrated in FIG. 22 or vertically as illustrated in FIGS. 25-28, or by providing another reflector or refractor to direct upwardly the light that travels past or through the first reflector.

In each case, the reflector may be specularly reflective or diffusely reflective as desired, and may be planar or curved as appropriate to the application. The reflector may also be partially transmitting so that part of the light passes through it. The reflector may also perform optical filtering function in reflection or transmission mode. The reflector may lie on the equatorial plane of the spherical light emitter 100 or may be located away from the equatorial plane desired to achieve the required optical function.

Figure 9:
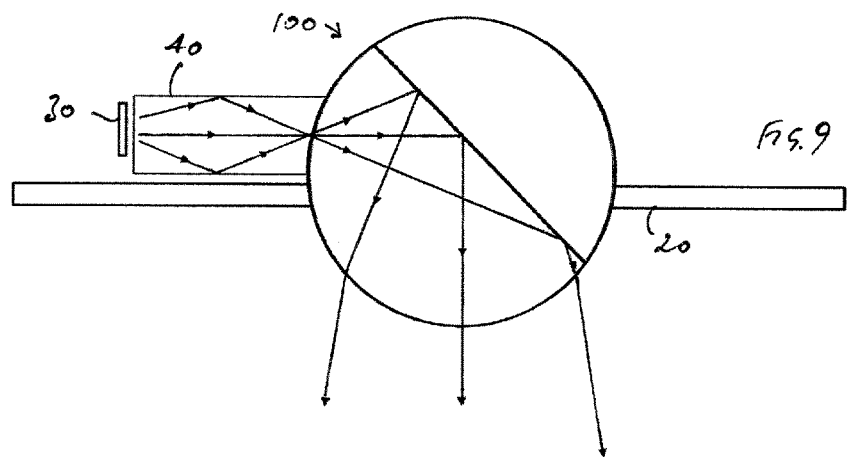
FIG. 9 shows another downlighter in which the central axis of the light conductor and the locus of the reflector are offset from the centre of the spherical light emitter.

FIG. 9 illustrates how the first reflector may be located at a distance from the centre of the spherical light emitter, and/or the length axis of the waveguide also may not coincide with the centre of the spherical light emitter. Various lighting effects are produced as the light emitter is rotated.

FIG. 10 shows another example of a lighting device in which the various optical axes of the system are not coincident with each other, including a planar first reflector whose locus does not lie within an equatorial plane of the ball optic. The more complex ray paths allow various lighting effects to be created.

In this and other embodiments, whether located at or away from the equator, the first reflector may extend for less than the full diameter of a spherical light emitter. For example, it may only occupy a central area of the spherical light emitter, allowing a portion of the light received from the light conductor to bypass the mirror for use in eg uplighting where the portion of the non-reflected light illuminates a ceiling or wall.

The embodiment of FIG. 10 includes a secondary light conductor, preferably a waveguide 42, which receives light that is not reflected from the mirror in the ball optic 100 and conducts it for example to another ball optic. A similar arrangement can be used for example in the embodiment of FIG. 23 where more than one ball optic is illuminated from a common light source. The light can bypass the first reflector or pass through the first reflector if it is partially transmissive before entering the secondary waveguide 42.

FIG. 11 shows how the light emitter can be rotated to reflect the light off a Lambertian reflector 102, for example, for use in uplighting mode to illuminate a ceiling from which the support plate 20 is suspended. The second reflector 122 may be specular to provide a narrower beam of more concentrated light when rotated into a downlighting position.

FIG. 12A shows how a textured surface region 106 can be formed as a knurled ring, either in a plane containing the first reflector (FIG. 12A) or in a plane that intersects the first reflector (FIG. 12B). The user can engage the textured surface region to rotate the light emitter by placing one finger on the ring. The knurled ring may be recessed beneath the adjacent smooth surface of the light emitter or alternatively may stand proud of the adjacent smooth surface of the light emitter. Its position is selected so that it does not interfere mechanically with the sliding support of the light emitter or optically with the incident or emitted light in its normal use positions.

Figure 13:
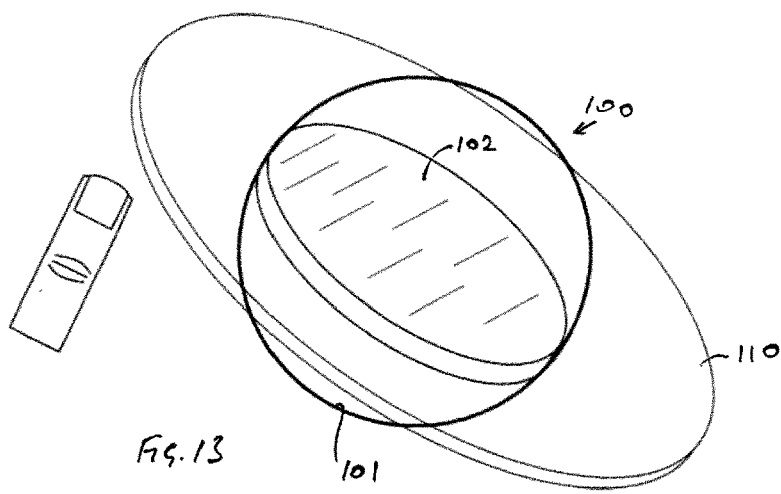
FIG. 13 shows a spherical light emitter with an external adjustment ring.

FIG. 13 shows a disc 110 which extends outwardly from the light emitter to provide a surface that can be manipulated by the user to rotate the light emitter.

Figure 14:
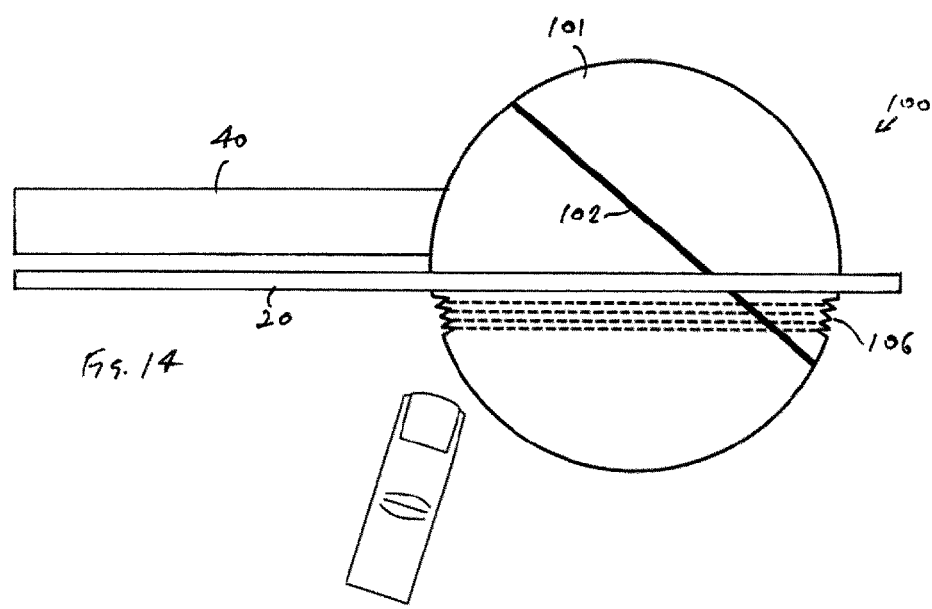
FIG. 14 shows a downlighter incorporating a light emitter with a textured surface region similar to that of FIG. 12B.

FIG. 14 shows another light emitter with a textured surface region 106, which may be for example a band of a suitable material such as embossed copper, a knurled or roughened surface cut into the material of the ball optic, or a bejewelled surface structure cut just below the diameter of the ball or a region encrusted with high quality jewelled optics and crystal structures. This may provide a decorative feature, for example, when the light emitter is one of several light emitters supported by a common support element 20 to form a track lighting system.

In alternative embodiments, multiple textured surface regions may be provided, or indents may be arranged at spaced locations on the surface of the light emitter to help the user to engage and rotate it.

Figure 15:
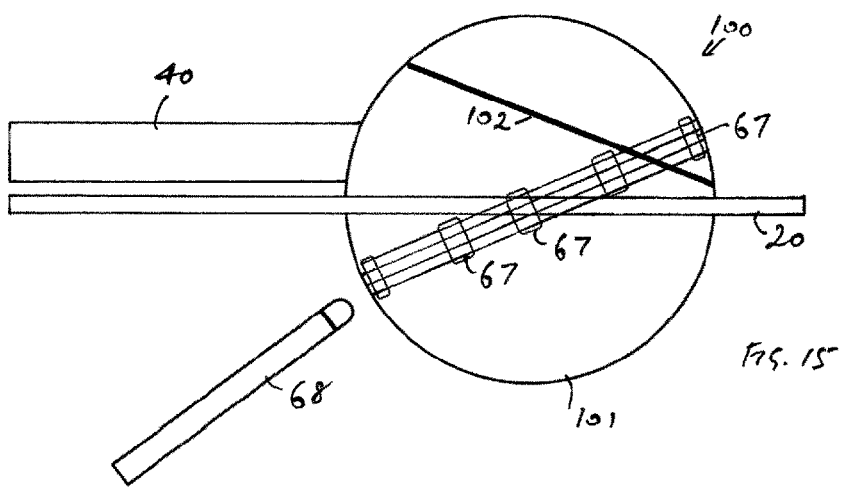
FIG. 15 shows a downlighter incorporating a spherical light emitter with a magnetic adjustment feature.

FIG. 15 shows an alternative adjustment arrangement in which magnets or magnet-responsive elements (e.g. steel bodies) 67 are embedded just within the diameter of the ball optic so that it can be rotated by a magnetic or magnet-responsive wand 68.

FIG. 16 shows how the light emitter can include one or more light scattering elements such as multifaceted diamond or 'glitter ball' 69, optionally on one side of a double sided reflector, to provide a decorative effect when rotated to the appropriate position.

FIGS. 17A and 17B show how the sliding contact surfaces of the light emitter and support element may be curved to match each other.

Referring to FIGS. 18A and 18B, the support element 20 may comprise a body material 24 with a contact surface 23 formed by a bearing material 25 which slidingly supports the curved surface of the light emitter. The bearing material may be relatively softer or have a lower coefficient of friction than the body material, and may be translucent to conduct light from the end face of the light conductor to the incident surface of the light emitter, for example, where the support element comprises a solid waveguide material in the form of a tube or a rod to function also as the light conductor. Even where a separate support element in provided, a similar sliding interface may be arranged between the waveguide and the light emitter.

Optionally, one of the contacting surfaces at the interface may be harder than the other, for example, by making the light emitter from glass or hard plastics material and the light conductor from a softer plastics material, or by providing either one of the surfaces with a hard or soft coating. For example, a layer of a relatively soft, optionally elastomeric, and optically translucent bearing material 25 may be applied to the surface of the waveguide at the interface, for example by 3D printing, while the incident or emitter surface of the light emitter at the sliding interface may be harder than the bearing material or alternatively may be formed by a coating on the emitter which is harder than the bearing material. The waveguide could also be provided with a layer of felt or other soft or antistatic bearing material, optionally as a replaceable pad, which forms or surrounds the sliding interface to reduce wear on the surface of the light emitter and wipe away dust as the light emitter is rotated in use. One or both of the sliding contact surfaces may also be protected by an antistatic or low friction coating. The bearing material or the whole support element may be 3D printed. A cushioned bearing material such as felt may also assist to hold the spherical light emitter in the required position after adjustment.

FIGS. 19A and 19B show how an elastomeric bearing material 25 can be 3D printed onto the body material 24 of the support element to form the contact surface 23 which cushions the light emitter in use. A similar, translucent material may be 3D printed onto the end surface 41 of the waveguide light conductor to reduce Fresnel reflections at the interface.

Figure 21:
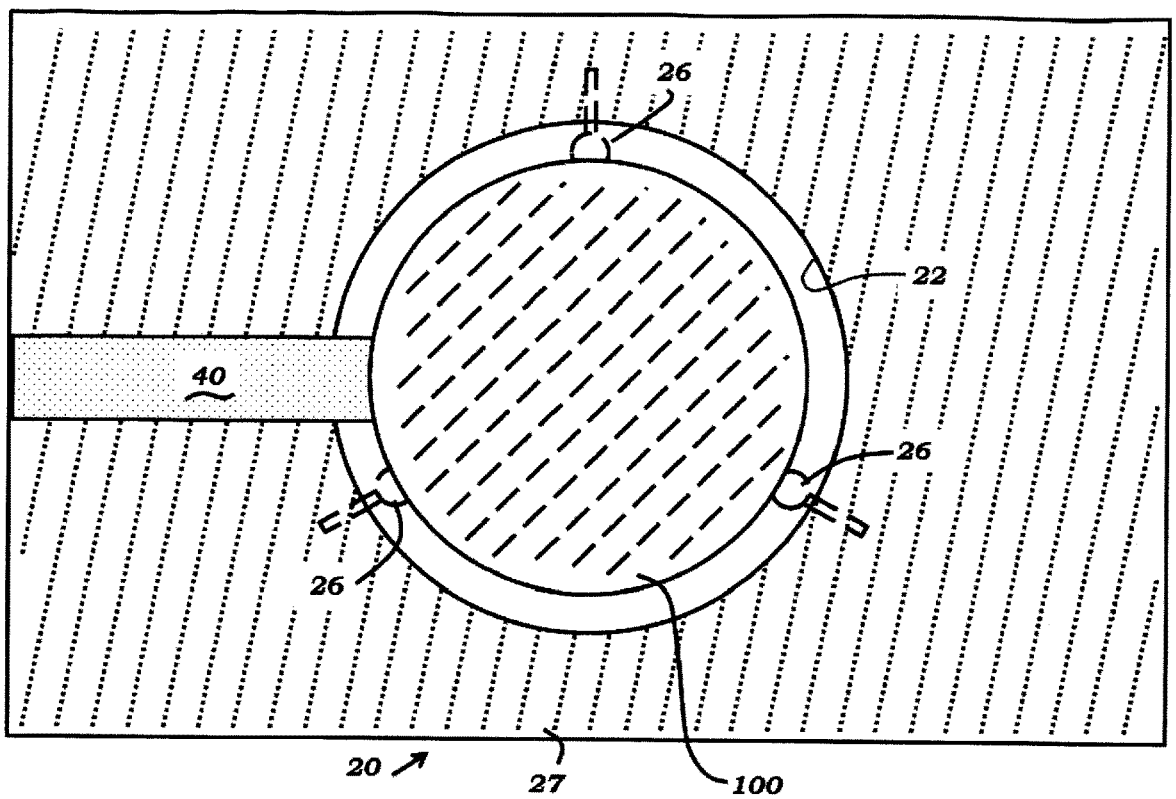

FIGS. 20 and 21 show another support arrangement in which the spherically curved surface of the light emitter is mounted to rest on a support element 20 comprising three ball bearings 26, optionally mounted for rotation, which are arranged around the periphery of a circular hole 22 in a horizontal support plate 27. The ball bearings centre the light emitter and reduce friction.

FIG. 22 shows a lighting device configured to be mounted on a wall 200. The spherical light emitter 100 is slidably mounted in a circular hole 22 in a flat support plate 20 which is attached to the wall and conceals the light source 30 and light conductor 40. Of course, the support plate could alternatively form the light conductor. A second light source 31 may be included to provide uplighting while the light emitter provides a downward beam for e.g. night time reading. The light sources may be separately switched. Advantageously, the well defined and evenly illuminated beam from the large incident and emitter lenses allows the user to read without disturbing other people present in the room.

Figure 23:
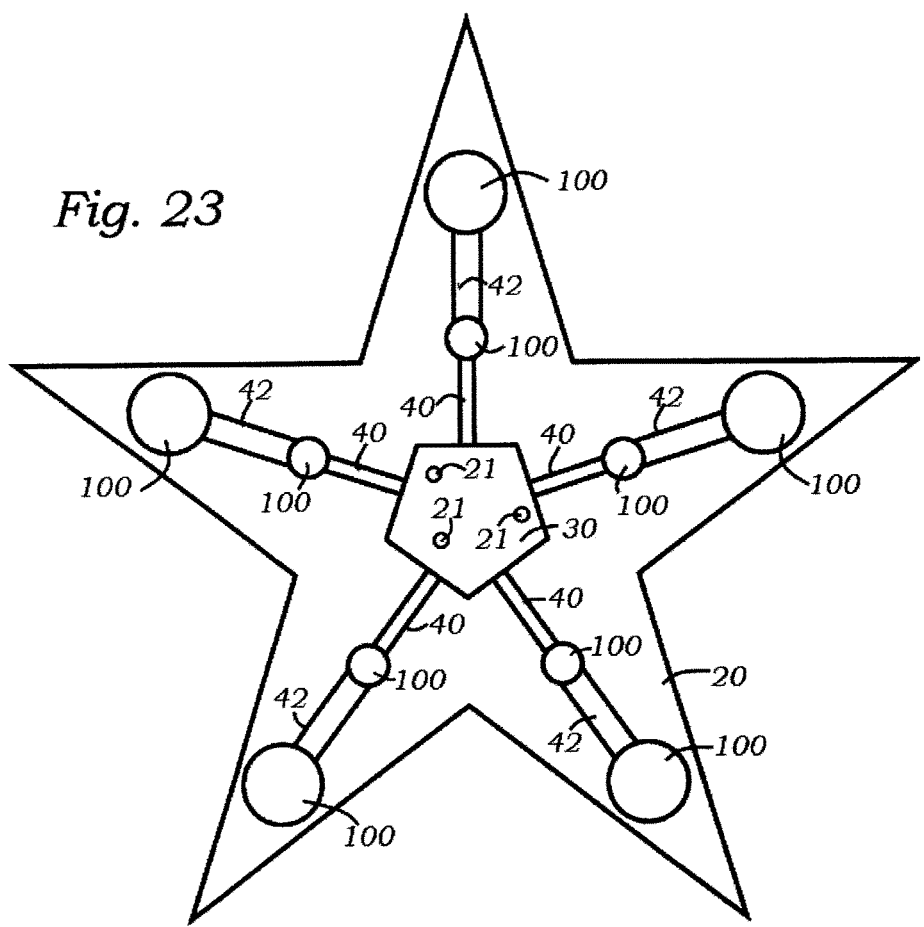
FIG. 23 is a top view of a downlighter comprising ten spherical light emitters mounted in a horizontal support plate.

FIG. 23 shows a lighting device which includes a plurality of light emitters 100. Each light emitter may be rotatable independently of the others. In the illustrated example, each light emitter is rotatably mounted to extend through a circular aperture in the support element 20 which is configured as a flat sheet. Fixing means 21 are provided for fixing the sheet in a horizontal use position beneath a horizontal surface such as a ceiling in spaced relation to the surface.

Each light emitter may comprise a spherical translucent body with first and, optionally, second reflectors generally as described above. The outer light emitters may be illuminated by secondary light conductors, preferably waveguides 42, which transmit part of the light which passes through the inner light emitters from the primary waveguides 40, in a similar way to the arrangement of FIG. 10.

In the illustrated example, the lighting device includes five arms arranged to form a star which supports different sized light emitters in the manner of a track lighting system. The light source 30 may comprise one light source which feeds all of the light emitters, or multiple light sources, each feeding a respective one or group of the light emitters via the light conductors 40 and, optionally, secondary light conductors 42.

Figure 24:
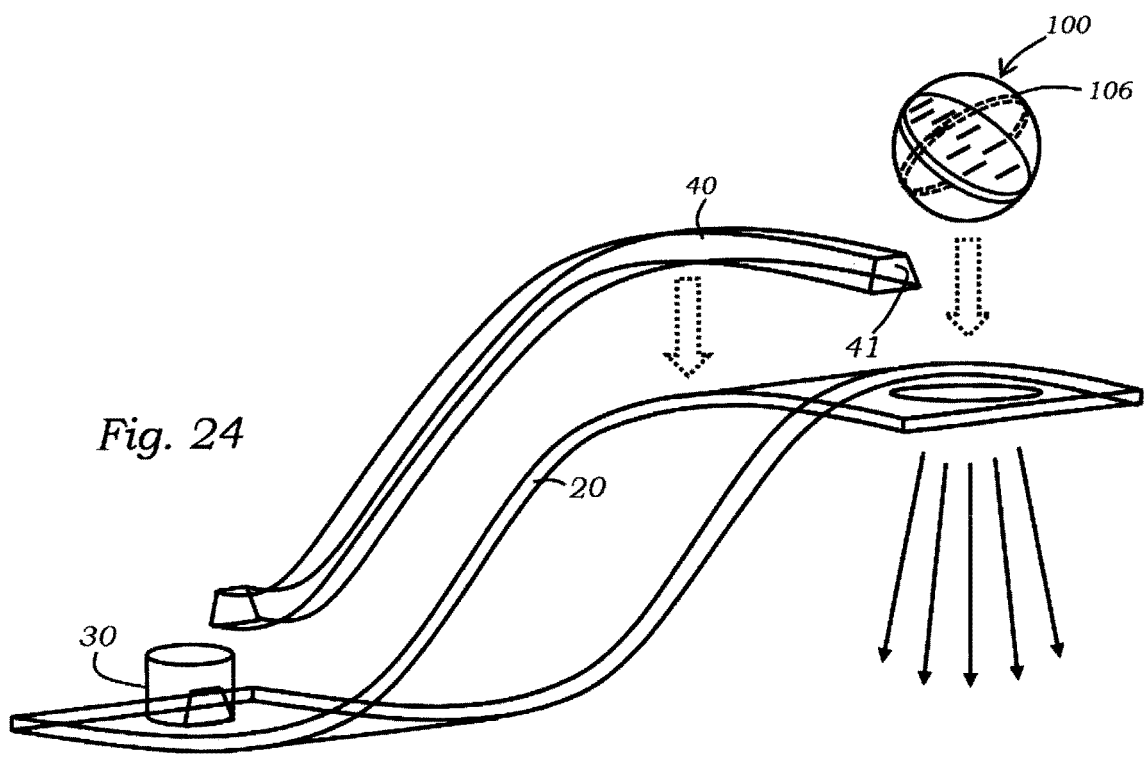
FIG. 24 shows a desk light comprising a spherical light emitter mounted in a support plate.

FIG. 24 shows how the light conductor may be formed as a curved waveguide 40, for example, of moulded acrylic. In the illustrated example the waveguide forms a trapezium in cross section, which can be usefully imaged onto the task plane if desired, but any other cross section may be selected. The support element 20 is arranged as a separate curved plate.

Figure 25:
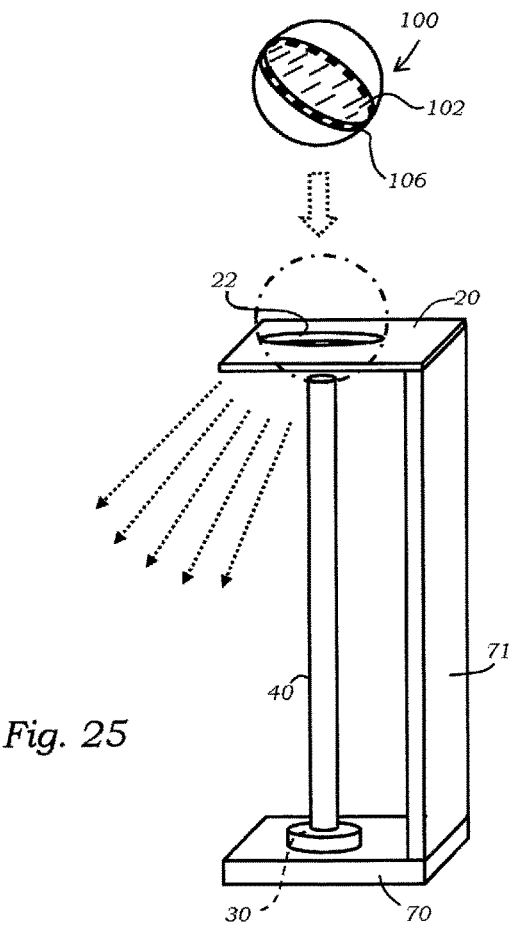
FIG. 25 shows a desk light in which the spherical light emitter is mounted in a horizontal support plate.

FIG. 25 shows how the light conductor may be arranged in a generally upright orientation to support a light emitter at its upper end. In this example the lighting device includes a base 70 with a vertical support 71 on which the support element 20 comprising a flat plate is mounted. The light source 30 is arranged at the base. In a normal use position as shown, the waveguide rod forming the light conductor 40 extends vertically upwardly from the base and the light emitter 100 is slidably supported in a circular aperture in the support element above the upper end of the light conductor.

Figure 26:
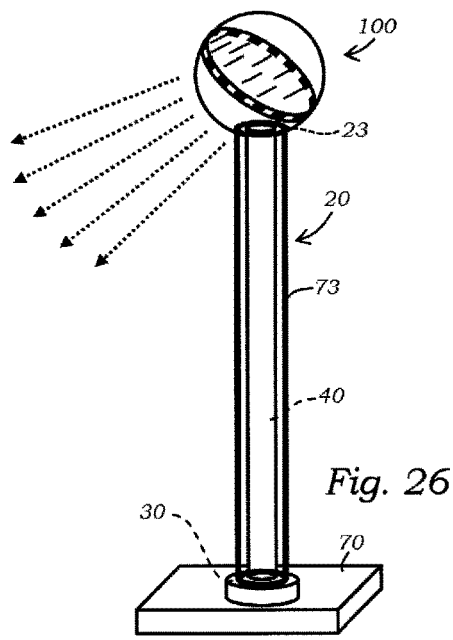
FIG. 26 shows another desk light in which the spherical light emitter is supported on top of a light conductor assembly comprising an inner light conductor and an outer shell.

FIG. 26 shows how the light conductor 40 formed as a solid waveguide rod may be surrounded by a tubular outer shell 73, optionally also a waveguide comprising a solid, translucent material, which together form a generally vertical support element 20 comprising a stem mounted on a base 70, with the light emitter being slidingly supported on the curved end face of one or both of the inner and outer stem components 40, 73 to form for example a desk lamp, a standard lamp or a light for use in illuminating a performer on a stage. The central light conductor waveguide 40 and/or outer shell 73 may be transparent to the observer when viewed from the side.

The outer shell 73 could be coloured and may be weakly illuminated to provide ambient lighting to the room in addition to the white light emitted as a more concentrated beam from the light emitter 100. The outer shell 73 may be illuminated either by conducting and scattering from its outer surface a portion of the light from the common light source 30 in the base, or by a portion of the light which is arranged to escape from the outer surface of the central light conductor 40, or by a separate light source (not shown), conveniently also in the base 70.

In this and other embodiments, an adjustable shroud or other means may be provided for selectively covering the outer surface of the light conductor 40 or shell 73 or otherwise altering the amount of light which is leaked from either component so that the user may adjust between 0% and 100% the proportion of light delivered respectively in the beam and as ambient lighting.

In this and other embodiments, where the light conductor is configured as a waveguide but comprises a tube of translucent waveguide material rather than a solid plate or rod, light may be conducted through the waveguide material by total internal reflection, and alternatively or additionally within the hollow interior of the tube, in which case a fraction of the light passing through the interior of the tube will leak out through the tube wall to provide ambient lighting.

Figure 27:
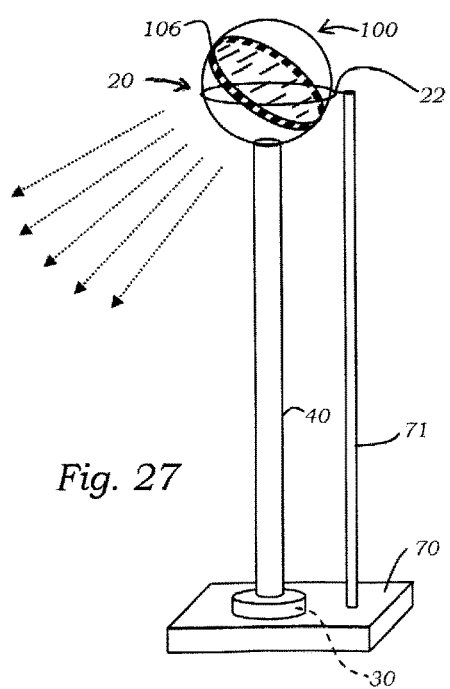
FIG. 27 shows another desk light in which the spherical light emitter is supported on a ring.

In the example of FIG. 27 the spherical light emitter is slidably mounted in a circular aperture 22 formed by the support element 20 which is a loop of wire supported on a vertical strut 71 mounted on the base 70 which also supports the light conductor 40 configured as a solid waveguide rod.

Figure 28:
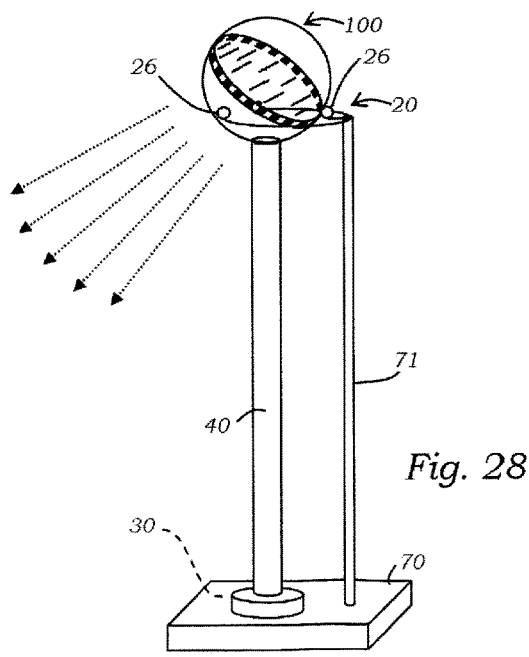
FIG. 28 shows another desk light in which the spherical light emitter is supported on bearings in a collar.

FIG. 28 illustrates a similar configuration in which the support element 20 comprises a yoke which supports three bearings 26. The bearings are equally spaced around the light emitter to support it as it rotates within the yoke.

FIGS. 29-32 illustrate an arrangement similar to that of FIG. 26, in which a central waveguide light conductor 40 is arranged within a tubular outer shell 73 whose upper end surface is shaped to form the contact surface 23 which slidably supports the spherical light emitter 100. The outer shell 73 is threaded at its lower end to engage an internally threaded collar 74 which extends upwardly from the base 30 to surround the light emitter 30 and light conductor 40. The outer shell 73 forming the support element 20 is rotated around its length axis to adjust the position of the contact surface 23 and so adjust the separation distance S between the incident surface 108 of the light emitter and the end face 41 of the light conductor from which light is emitted. The base 70 can be heavy so as to support the lighting device in the use position, for example, to form a desk lamp.

Figure 31:
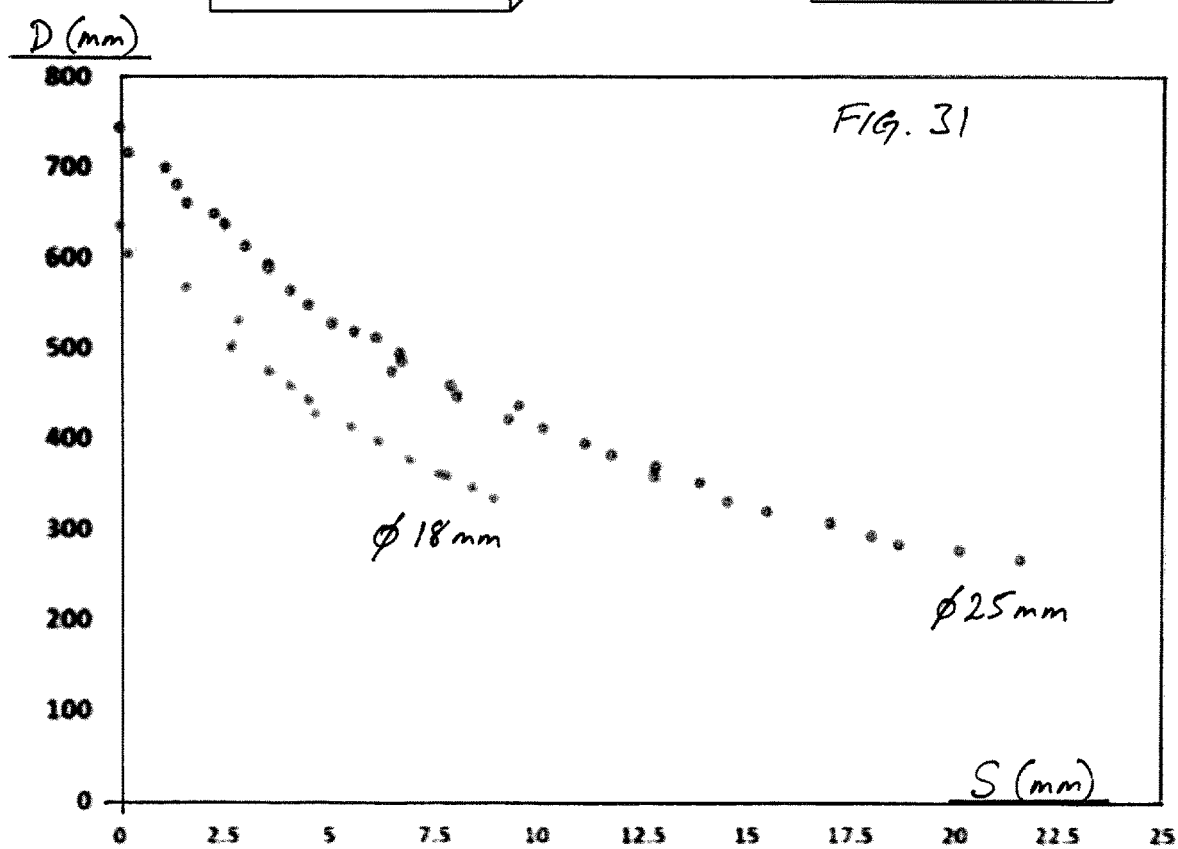
FIG. 31 shows how the diameter of the spot projected onto a desktop by the desk light of FIGS. 29 and 30 is varied by adjusting the outer shell from the FIG. 29 position to the FIG. 30 position.
Figure 32:
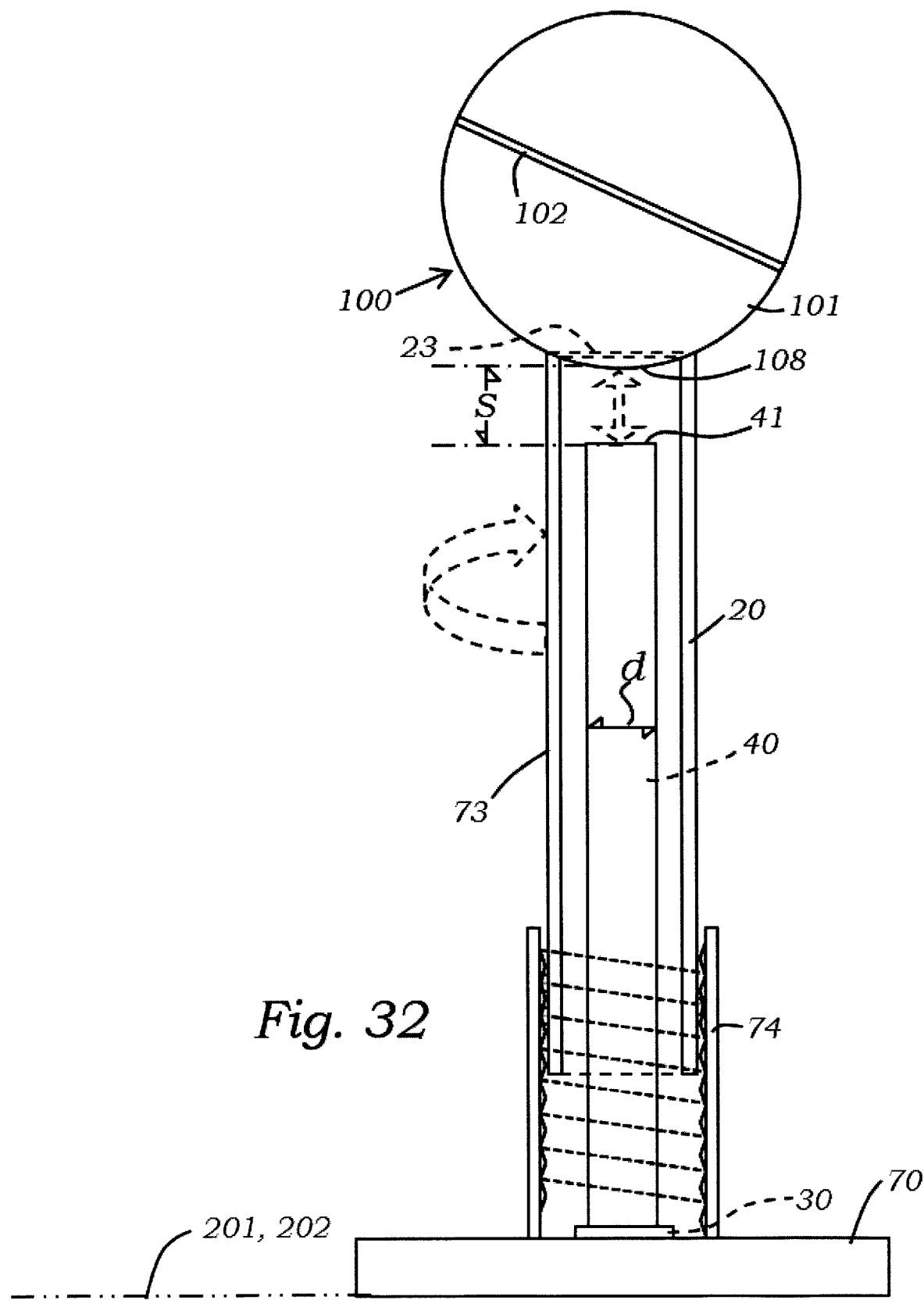
FIG. 32 is an enlarged view of the desk light of FIGS. 29 and 30 showing the screw thread adjustment mechanism.

FIG. 31 shows how, when the lamp stands on a horizontal support surface 201 such as a desktop, the mean diameter D (mm) of the spot formed by the beam on the support surface can be altered by adjusting the separation S (mm) between the end face of the inner light conductor and the incident surface of the light emitter. The data presented represent an inner light conductor formed as a solid cylindrical translucent waveguide rod with a diameter d of 18 mm or 25 mm.

The ball optic effectively behaves as a classical lens converting the input family of rays that are emergent from the waveguide rod 40 into an exit family of rays where there is a conjugate imaging relationship between input and exit beam cones. In this manner the size of the spot projected from the ball lamp system can be altered to a manner suited to the lighting task such as reading a small book or large newspaper.

Figure 29:
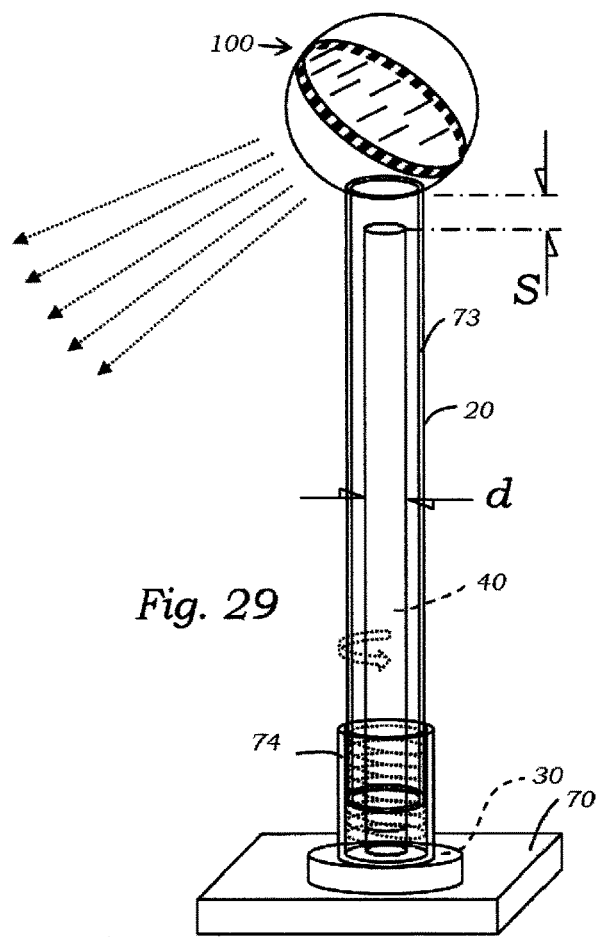
FIGS. 29 and 30 show another desk light in which the spherical light emitter is mounted on a tubular outer shell surrounding an inner light conductor, the outer shell being rotatable to adjust the distance between the light emitter and light conductor.
Figure 30:
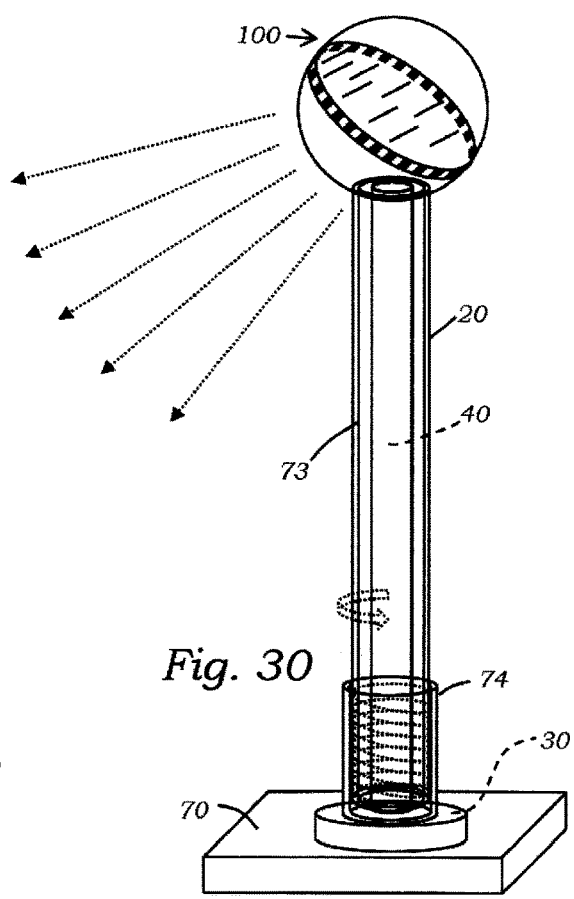

The separation distance S between the distal end of the waveguide rod and the ball optic could be varied from contact distance (i.e. zero separation) (FIG. 30) to a separation distance of the order of 20 mm (FIG. 29). The graph shows that for the lamp system design parameters chosen, including a choice of two different waveguide rod diameters, the diameter of the spot of light projected onto the task plane (desk) could be varied over a useful range from 300 mm diameter to 700 mm diameter, encompassing the desired task range for reading e.g. a small book or a large newspaper.

The shape of the projected spot on the task plane is determined by the cross section of the waveguide rod. For example, a circular profile waveguide rod will project an elliptical spot while a square profile rod will project a rectangular spot. If a circular or square spot is desired then the light conductor may have an elliptical or rectangular cross section with the shorter axis aligned with the horizontal vector of the beam to compensate for the angle of incidence of the beam on the target surface.

In alternative embodiments another manual or automated mechanism could be employed to vary the separation distance S.

Figure 33:
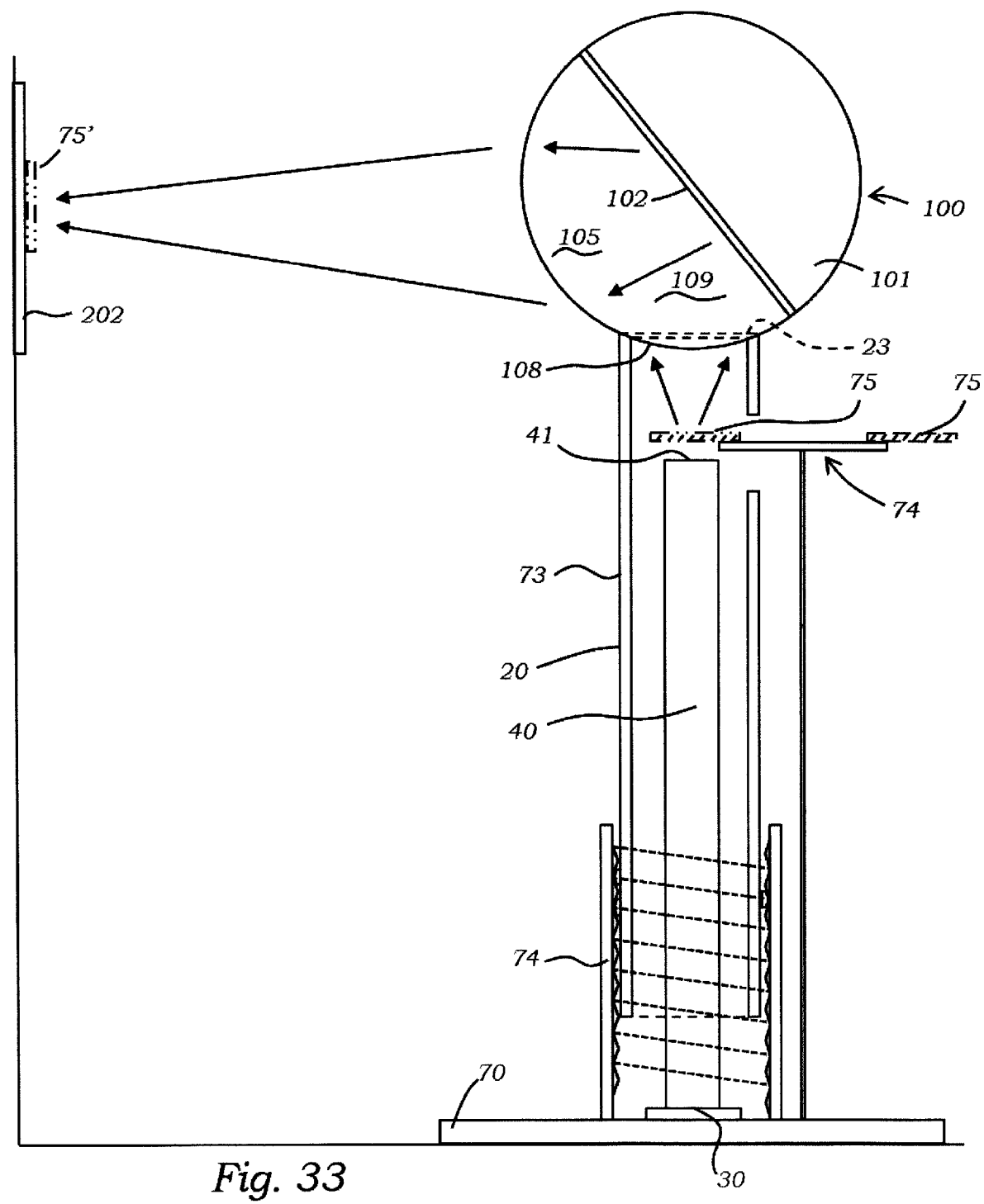
FIG. 33 shows another lighting device which is adapted to project an image onto a target surface, and having an adjustable outer shell for focusing the image.

FIG. 33 illustrates how an object 75 may be arranged between the light conductor and the light emitter, and the lighting device arranged to project an image 75' of the object onto a target surface 202. The object may be a static or moving image, an indicium, or anything else that can be projected as an image onto the target surface.

In this example the lighting device is arranged to form a conjugate imaging system in which the separation distance between the incident surface 108 of the spherical light emitter 100 and the emitting end face 41 of the central light conductor waveguide rod 40 is adjustable by rotating the threaded, tubular outer shell 73 in the collar 74 to vary the height of the contact surface 23 in a similar way to the embodiment of FIGS. 29-32. A carousel type system 74 is provided whereby an object 75 configured for example as a slide or partially opaque mask, or other beam modifiers such as a filter or a polariser can be rotated into a position between the end face 41 and the incident surface 108.

In this configuration the lighting device could be used for example as a projection lamp system for projecting illuminated images (e.g. words, signs, or other indicia) onto a task plane, which can be brought into or out of focus as needed by vertical adjustment of the ball optic relative to the object plane as shown.

In this and other embodiments, the light conductor may have a non-circular cross section which defines a cross section of the beam. For example, if the beam is to illuminate or project an image onto a rectangular target surface (such as a region of a desk, or a sports arena), then the light conductor may have a square or rectangular cross section so that the spot or image has the same shape and size as the target surface.

An optical system involving an object, a lens and an image location can be recognised as being a so-called conjugate imaging system wherein in any of the three main parameters: object distance (u), focal length (f) of lens, and distance to image location (v); might be arranged to be variable depending upon the specific application.

In alternative embodiments a digital light projection source such as an LCD display could be located at the object plane in place of the carousel 74 to project and display moving graphic images or other objects, forming a so-called 'semantic' lighting system in which light projection technology is combined with general task lighting. Any of the lighting devices described herein might be configured in a similar to way to function 'semantically', for example, to simultaneously illuminate and display the sales price upon an object on a shelf in a retail outlet.

Figure 34:
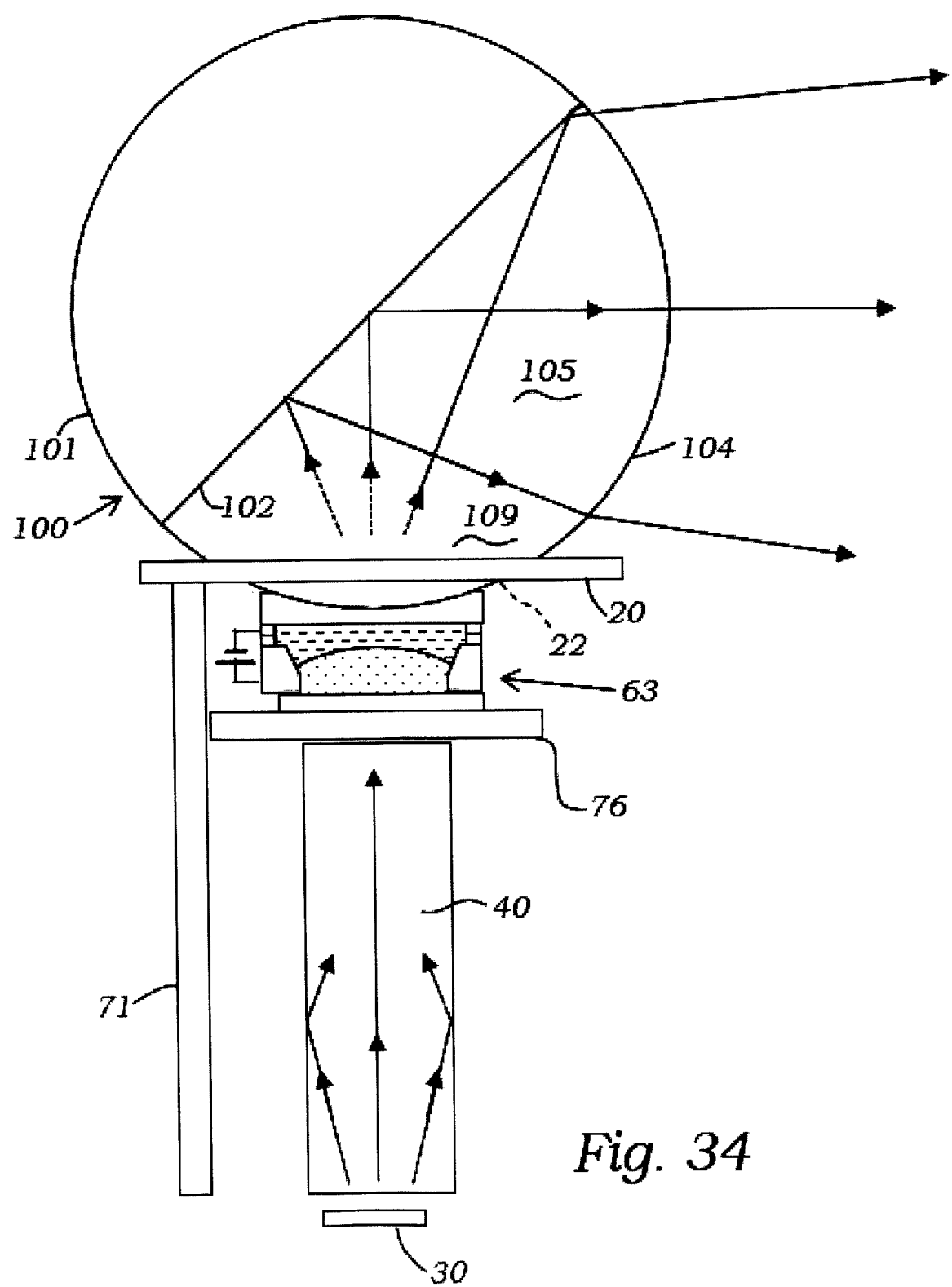
FIG. 34 shows another lighting device for projecting an image and including a variable focus liquid lens between the light conductor and the spherical light emitter.

FIG. 34 shows how a slide holder unit or LCD type display 76 may be located immediately in front of a variable focus optical system such as a liquid lens 63 as previously described, whose focal length can be adjusted to ensure that the object displayed on the slide or display can be projected and focused at a target location. Advantageously, focus adjustment is achieved without any moving parts except for the liquid lens chamber.

Such a lighting device may be used for example to illuminate a retail item and display relevant information (e.g. price, size etc) upon the illuminated item, where the signage information is stored in the lighting device. The ball optic device will allow the sales person to easily steer and direct the beam to the item and illuminate with light and/or information as desired.

Figure 35:
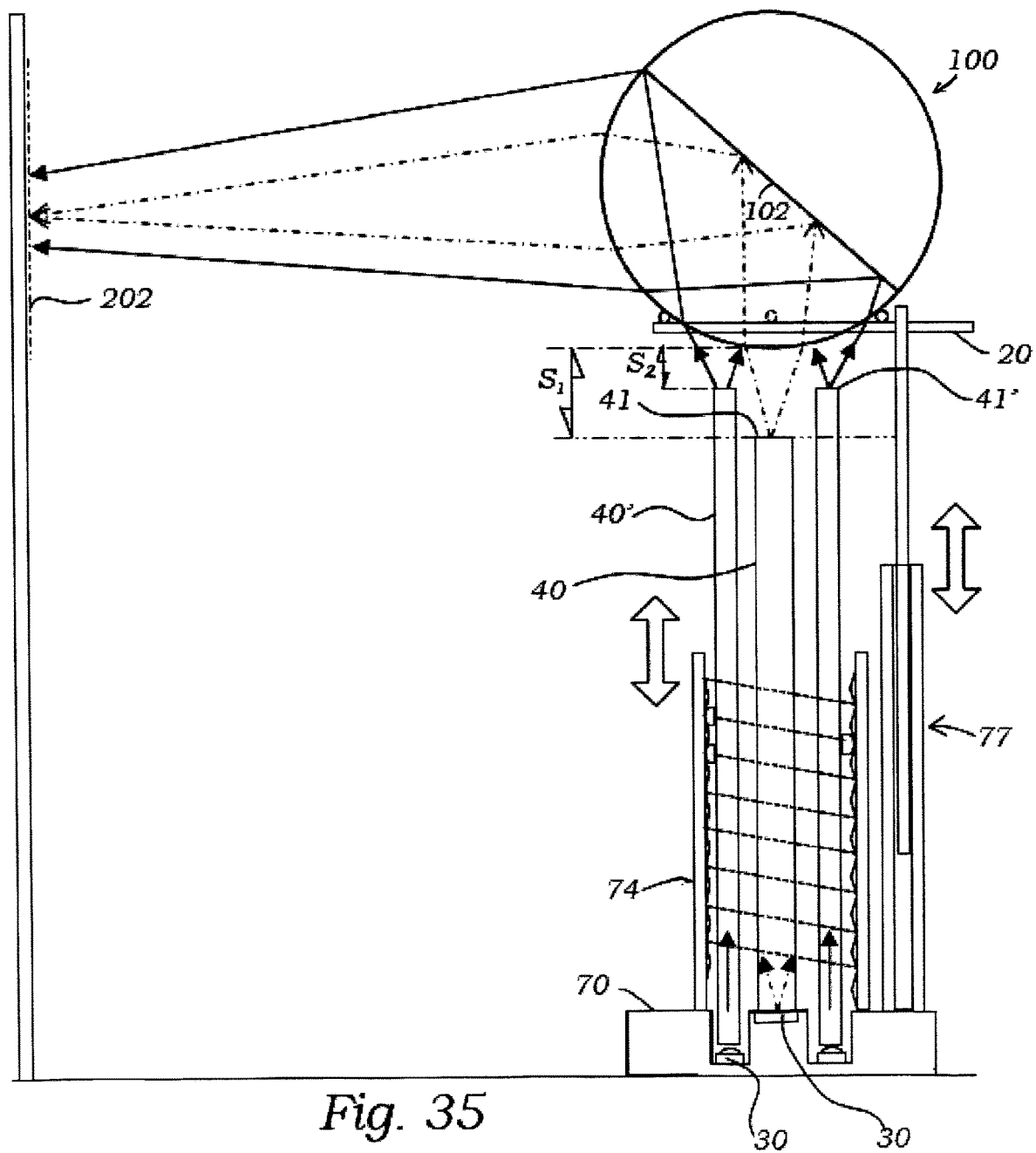
FIG. 35 shows another lighting device including concentric, inner and outer light conductors and an adjustable focusing system for projecting concentric, inner and outer beams onto a target surface.

FIG. 35 shows how a lighting device may include a first light conductor 40 and a second light conductor 40'. The first reflector 102 is arranged to reflect light emitted from the first and second light conductors to exit the light emitter, respectively as a first beam and a second beam via the first emitter lens. In the illustrated example, the second beam is arranged to surround the first beam. This is accomplished by arranging the second light conductor 40' as a tubular shell of solid waveguide material surrounding the first light conductor 40. The light source 30 comprises multiple LEDs arranged in the base 70 to emit light into the lower end face of each light conductor.

The light emitter 100 may be spaced apart from at least one of the first and second light conductors by an adjustable distance, and a first adjustment means provided for varying the distance between the light emitter and a respective one of the first and second light conductors without varying a distance between the light emitter and the other respective one of the first and second light conductors. In the illustrated example, the first adjustment means comprises a threaded collar 74 in which the outer tubular second light conductor 40' is received so that it can be rotated to alter the separation distance S2 between the light emitter and its emission surface 41' without altering the corresponding separation distance S1 between the light emitter and the emission surface 41 of the first light conductor 40.

Different types of light source 30 may be combined into the lamp system to be projected onto a suitable task plane using appropriate degrees of in and out-of-focus imaging of the different illumination spectra as required. For example, a targeting beam using a beam of light from the second light conductor 40' could be used to identify and define a subject in the task plane by for example projecting a ring or annular image onto the task plane, and light from the first light conductor 40 could be used to irradiate the subject with light from a suitable region of the spectrum.

For example, this could be utilised in laser surgery to ensure that the surgeon is targeting the correct location for surgery prior to firing of the main (surgical) beam. Advantageous features include the centration of the various optical elements around a common optical axis, and the ease with which that axis can be directed towards a task plane.

The illustrated example shows one way to achieve the relative adjustment between the ball optic and the optical waveguides by means of simple sliding and rotational adjustment mechanisms. Rotation of the outer cylindrical tubular waveguide 40' within the threaded collar 74 provides a focusing action (up and down movement) for the outer waveguide 40' projecting lighting onto the task plane. In addition, the separation distances S1 and S2 between the light emitter 100 and the emission surfaces 41, 41' of both the inner and outer waveguides 40, 40' can be simultaneously adjusted by a vertical threaded adjustment mechanism 77 as shown which alters the height of the support element 20 above the base 70. The mechanism 77 could be automated, for example, to be driven using a stepper type motor. Of course, alternative adjustment mechanisms may be used.

Figure 36:
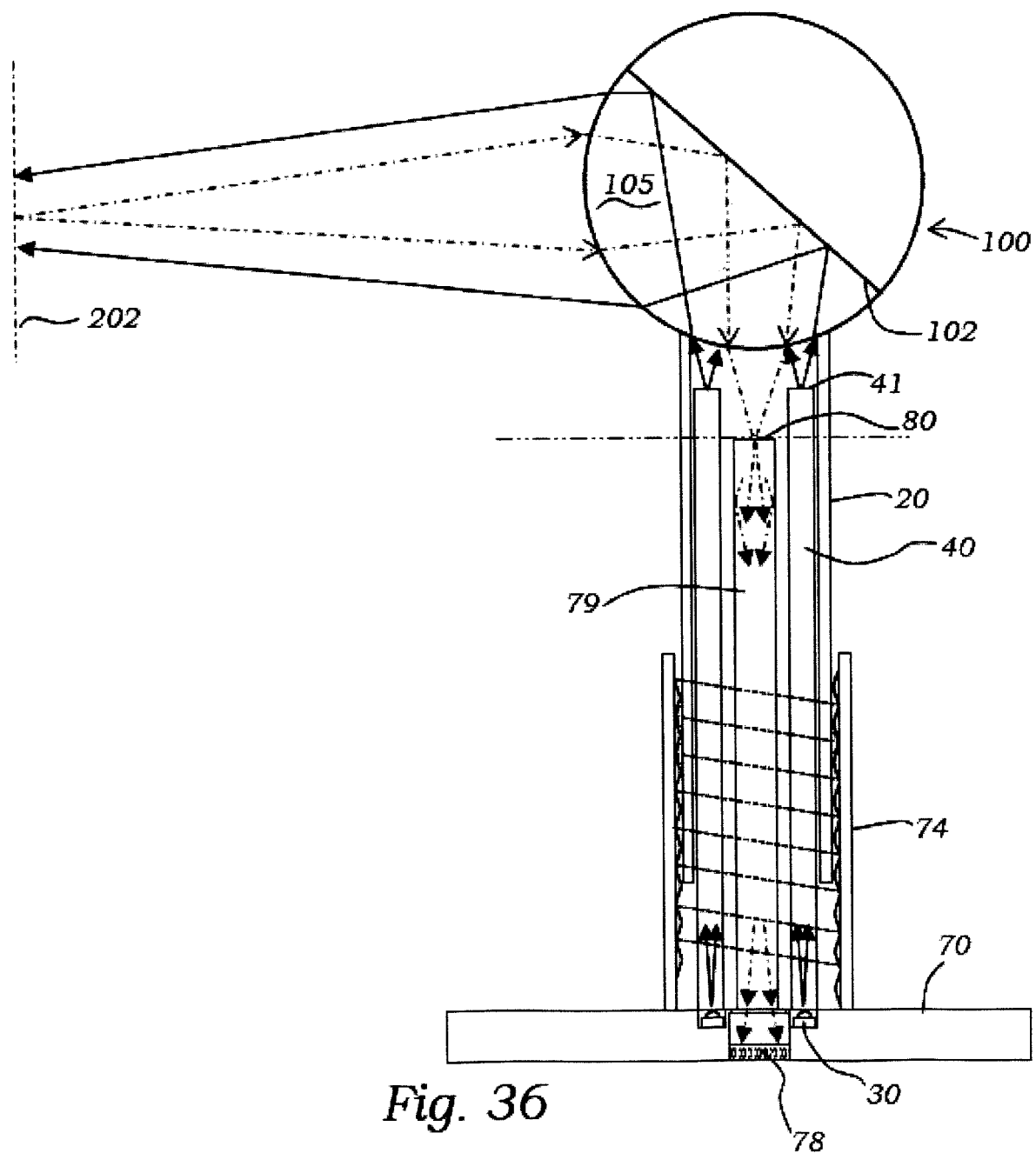
FIG. 36 shows another lighting device in which a light detector is arranged at the base to receive light which enters the light emitter via the first emitter lens and is reflected by the first reflector, and including an additional (inner) light conductor to conduct light from the light emitter to the light detector.

FIG. 36 shows how a lighting device may include a light detector 78 which is arranged to receive light which enters the light emitter 100 via the first emitter lens 105 and is reflected by the first reflector 102. In the illustrated example, the lighting device includes an additional light conductor 79 for conducting the light which enters the light emitter via the first emitter lens and is reflected by the first reflector to the light detector 78.

The lighting device is adapted to provide a conjugate imaging system in which a subject or target located in the task or image plane 202 can be imaged back into the lamp system and conveyed by, for example, a waveguide collection system including the additional light conductor 79 to the detector 78 which may be arranged in any suitable detection plane. In this manner the incoming light signal can be processed in the detection plane by the detector 78, which may be for example a camera system for resolving images, a simple light detector for discriminating between the presence and absence of light, or any other detecting element, and the image or signal processed accordingly. The analysis of the detected image or signal from the task plane might then invoke an adjustment of the direction of the beam or the wavelength or intensity of the illumination from the lamp system as appropriately required for the given task.

The figure shows a set of rays of light from the light conductor 40 which is configured as a tubular waveguide being projected onto the task plane 202, whilst light rays coming from the task plane are collected and imaged back into the system by the ball optic 100 wherein they are focused by the large emitter and incident lenses onto the end of a central light collection waveguide 79; upon entering the light collection waveguide 79 the incoming optical signal is conveyed by total internal reflection to the detector 78 mounted in the base 70. Advantageously, only passive, optical components are present above the base 70, with all the optoelectronic components being arranged in the base unit 70, so that the lighting device is of simple construction and could be used for example in sensitive or hostile environments.

In alternative embodiments, instead of a single outer tubular waveguide, an annular array of waveguide illumination rods might be mounted around the central light collection waveguide 79.

As with the light conductor in the other described embodiments, the waveguide 79 might alternatively be replaced by a tube containing a plurality of lenses arranged in spaced, series relation.

Vertical adjustment of the ball optic 100 for variable conjugate imaging between the task plane 202 and the central light collection waveguide 79 is achieved by the outer cylindrical support tube 20 which is located inside a threaded collar 74 so that it can be rotated to lower or raise the ball optic 100 relative to the central waveguide 79.

Depending on the task to be achieved the end faces 41, 80 of the illumination waveguide and the central detection waveguide may not necessarily be co-planar. For example, the figure shows the situation where the end 41 of the outer illumination waveguide is set closer towards the ball optic 100 than the end face 80 of the central waveguide 79. In this manner, when the central waveguide 79 and the task plane 202 form a conjugate image pair, the light from the outer illumination waveguide 40 is blurred or distributed across the task plane. Such a situation might be useful in analysis of e.g. fluorescence from an object located at the task plane 202, where the (blurred) light from the illumination waveguide 40 stimulates fluorescence from the object by broadly illuminating it with light, whilst the fluorescent light emitted by the object is imaged back into the central collection waveguide 79 for detection and processing at the detector 78.

If the end faces 41, 80 of the respective illumination and detection waveguides are arranged to be coplanar, and conjugate to the task plane, the light from the illumination beam will form an annulus (circle or ellipse) around the central region of the task plane 202, and any light from within the projected ellipse will be imaged back onto the light collection waveguide 79.

Alternative means of adjustment could be devised to allow for the outer illumination waveguide 40 to be adjusted relative to both the ball optic 100 and the central waveguide 79 to allow for a range of conjugate imaging scenarios (i.e. blurred or in-focus).

In the figure, the light imaged onto the end face 80 of the central light collection waveguide 79 is refracted and guided towards the detection system 78 located in the base 70 of the lamp housing, and depending upon the length and diameter of the light collection waveguide 79, the refracted rays may undergo total internal reflection as they propagate along the guide. At the receiver end 78 of the light collection waveguide, the detected signal or image can be processed by a sensor or computer system, and the lamp system adjusted accordingly to move the illumination beam to follow a moving object, or to increase or reduce the level of light on the scene.

It is a property of physically large 'macro' optical waveguides (for example, of tens of millimetres in diameter) that dependent upon the quality (e.g. polishing) of the end face surfaces of the waveguide, an image focussed upon one end of the waveguide can be transferred reasonably well to the other end of the waveguide, whereupon it can be viewed by a camera system if so desired. Alternatively, if the waveguide end faces are made diffuse, the light rays in the waveguide can become scrambled with no such imaging possible.

This makes it possible for example to mount a camera system 78 in the base 70 of the lamp, which in conjunction with the other features of the lamp system may be used to detect a specific movement within the field of view of the ball lens optic 100 and adjust the light output and focus of the system accordingly. The rotary ball joint action of the incident and emitter lenses combined in spherical light emitter 100 (slidably mounted on support tube 20) can then readily be used to follow the target as it moves across the scene.

It can be further understood that the illumination and detection light beams may be chosen as required from different bands of the electromagnetic spectrum, for example, ultraviolet, visible, and/or infrared.

Figure 37:
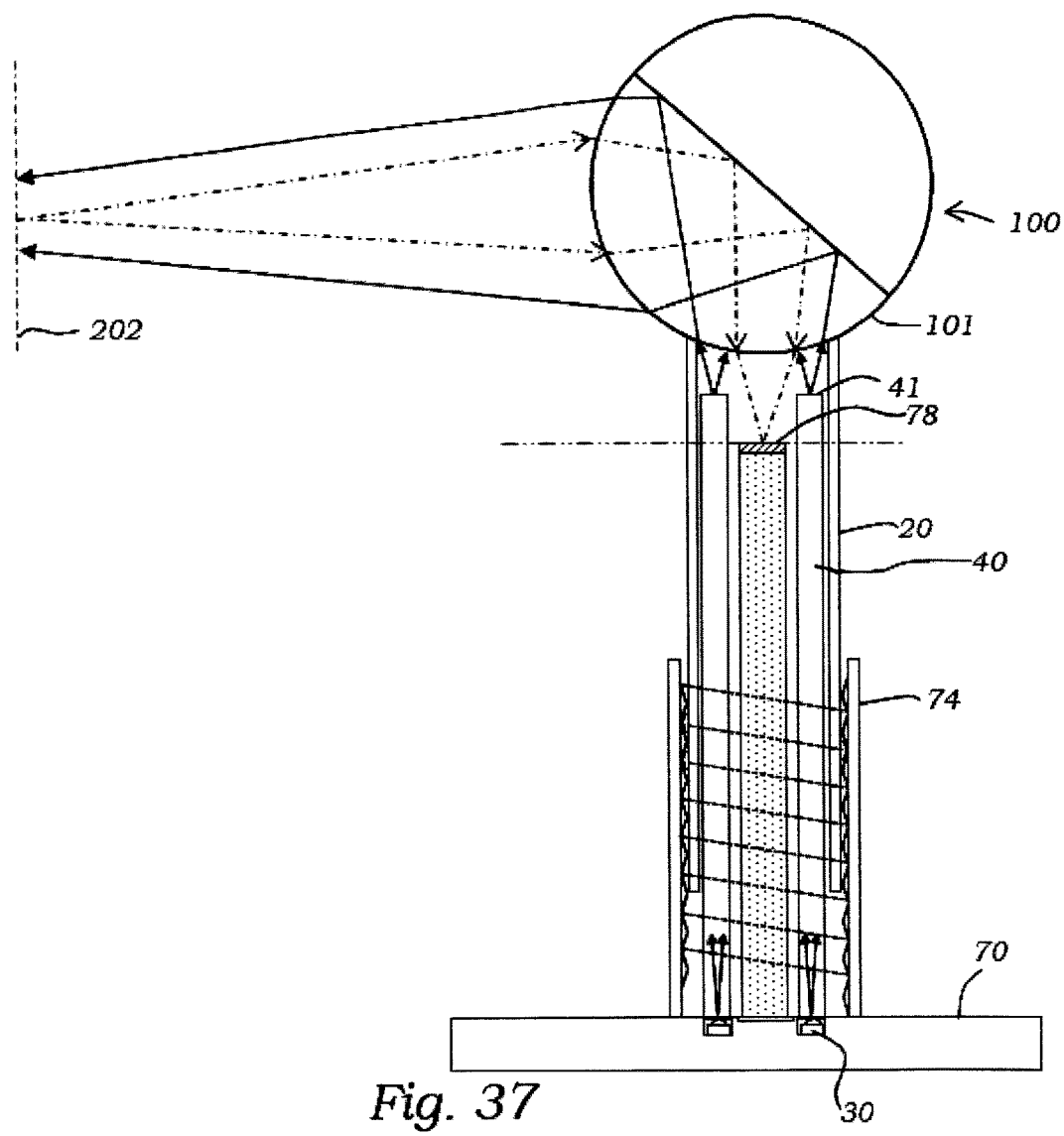
FIG. 37 shows another lighting device generally similar to that of FIG. 36, but with the detector mounted at the conjugate image plane.

In the example of FIG. 37, a light projection and detection system generally similar to that of FIG. 36 utilises a camera or detector 78 which is located at the conjugate image plane of the optical system (relative to the task plane) instead of at the lower end of a waveguide as in the FIG. 36 embodiment. This could be used for example where there is a desire to detect the incoming light signal directly, thereby avoiding loss and/or distortion of the incoming light signal by a light collection waveguide.

The ball optic 100 can be adjusted to achieve suitable conjugate imaging between the task and detection planes by use of an outer supporting tube 20 located within a threaded collar 74 to allow for a vertical lowering or raising of the ball optic 100 relative to the detector 78. Alternative means could be provided for independently or simultaneously adjusting the relative positions of the emission face 41 of the tubular illumination waveguide light conductor 40, detector 78, and/or ball optic 100.

Figure 38A:
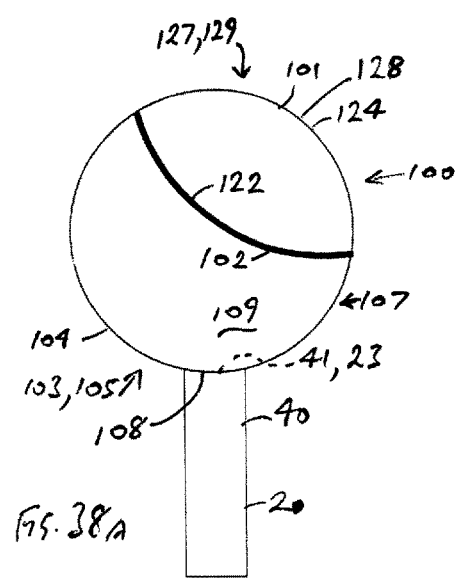
FIGS. 38A and 38B show another lighting device with the light emitter rotationally adjusted to two alternative positions.
Figure 38B:
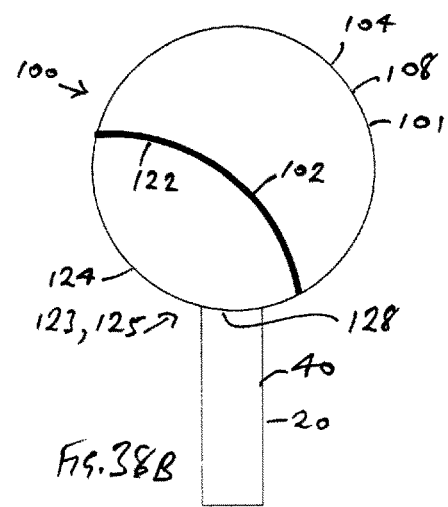

FIGS. 38A and 38B show another lighting device with a spherical light emitter, illustrating how the light emitter may include a first reflector 102 a second reflector 122 with different characteristics. The translucent body 101 of the light emitter 100 includes a first emitter portion 103 defining a first emitter surface 104 which is shaped to define a first emitter lens 105, which functions as generally described above to transmit light from the first reflector as a first beam, together with a second emitter portion 123 with a second emitter surface 124 which is shaped to define a second emitter lens 125. The second reflector 122 is arranged to reflect the light emitted from the light conductor 40 to exit the light emitter 100 as a second beam of light via the second emitter lens 125.

In the example shown, the first and second reflectors are arranged back to back and curved so that the first reflector is convex and the second reflector is concave, allowing the user to select two different beam types and to rotate each beam as required into the desired position. The light emitter is thus rotatable relative to the light conductor to reflect light emitted from the light conductor selectively from the first and second reflectors.

Optionally, the first and second reflectors may be configured and located so that the light emitter may also be rotated to a position in which it reflects light emitted from the light conductor simultaneously from the first and second reflectors.

In this and other embodiments, the first reflector may be specular on one side to form the main beam, while the second reflector may be diffuse or Lambertian to produce a wider, less sharply defined beam which provides ambient light, which may be directed upwardly so as to illuminate a ceiling.

The translucent body 101 includes a first incident portion 107 which is arranged to conduct light emitted from the light conductor to the first reflector, the first incident portion having an incident surface 108 which is shaped to define a first incident lens 109, as in the foregoing embodiments. The translucent body further includes a second incident portion 127 which is arranged to conduct light emitted from the light conductor to the second reflector, the second incident portion having a second incident surface 128 which is shaped to define a second incident lens 129. It can be seen that the first and second incident lenses are defined by two respective portions of one combined incident surface 108, 128 having continuous spherical curvature which extends across both of the incident lenses.

In other respects the light emitter is generally mounted and functions similarly to the other embodiments earlier described. The lighting device includes a support element 20 (which in the illustrated embodiment comprises the light conductor 40), and the combined incident surface 108, 128 is slidably mounted on the support element to support the light emitter in rotation with at least two degrees of freedom relative to the support element.

Optionally, as illustrated by FIG. 23, the lighting device may include a plurality of said light emitters, each light emitter being rotatable independently of the others. Where the support element 20 is a sheet, as shown in FIG. 23, each light emitter 100 may be arranged to extend through an aperture in the sheet, and the lighting device may include fixing means for fixing the sheet in a horizontal use position beneath a horizontal surface in spaced relation to the horizontal surface.

Figure 39:
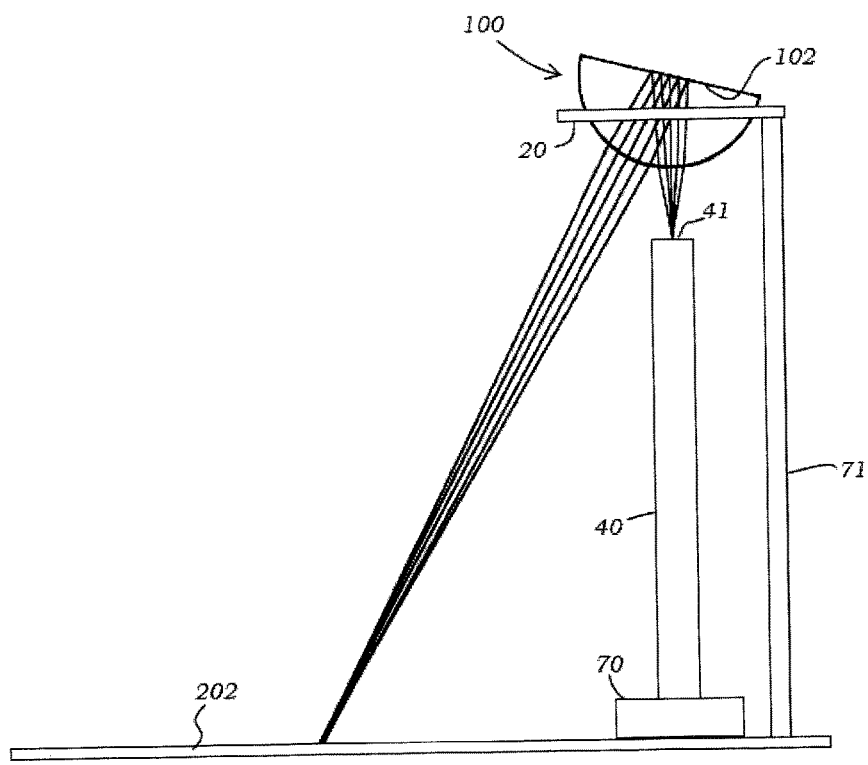
FIG. 39 illustrates the ray paths in a lighting device in which the light emitter is configured to project an image from an object plane onto a target plane.

FIG. 39 illustrates a lighting device in which the end face 41 of the light conductor, formed as a waveguide rod 40, defines an object plane, and the hemispheric light emitter 100 is arranged with the waveguide 40 to form a conjugate imaging system to project an image of an object at the object plane onto the task plane 202. It will be understood that ray paths similar to those depicted in FIG. 39, although not illustrated, may also be present in the various other embodiments in which the lighting device is arranged to form a conjugate imaging system as discussed above.

Figure 40:
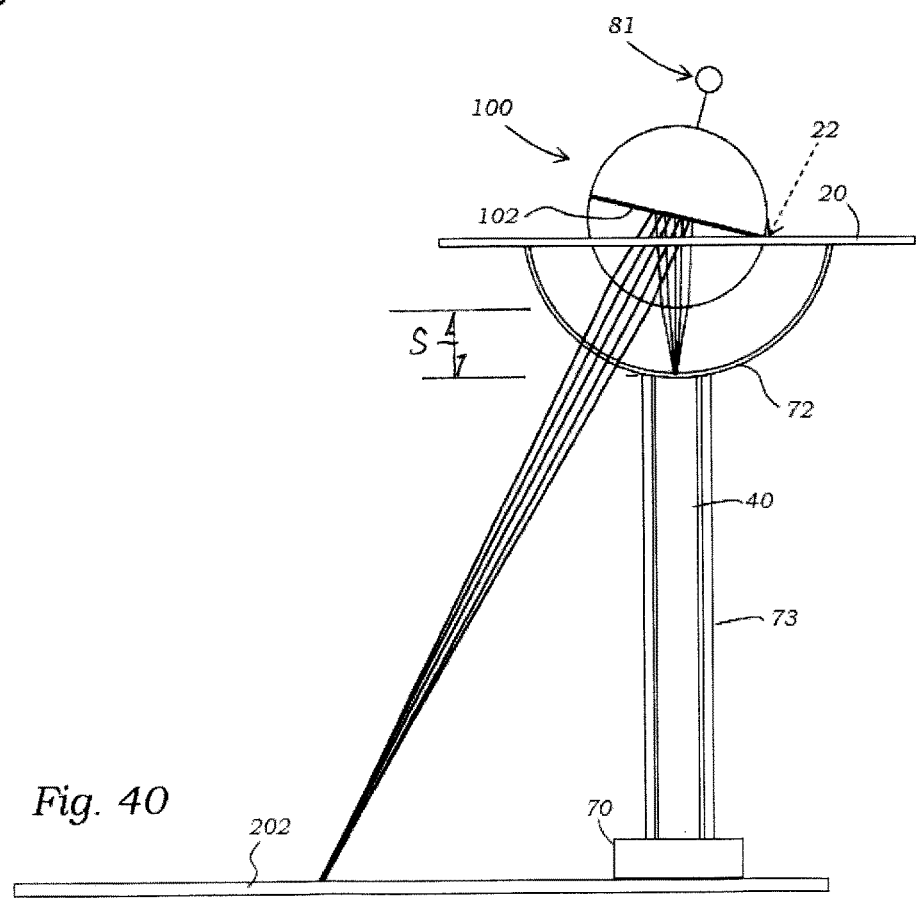
FIG. 40 shows another lighting device in which the incident surface of the light emitter is enclosed between a flat plate and a transparent hemisphere.

Referring to FIG. 40, the light emitter 100 is arranged with its incident surface slidingly received in a circular aperture 22 in a support element comprising a flat plate 20, made for example of transparent or opaque plastics material, stainless steel, or other material, in a similar way to previously described embodiments. In this embodiment however the support plate 20 is mounted on a transparent shell 72 so that the downwardly facing, incident and emitter surfaces of the light emitter are enclosed between the plate 20 and the shell 72 and the beam is emitted via the shell. Advantageously, this arrangement entirely excludes dust from all the optical surfaces of the light emitter and the light conductor. The shell 72 is advantageously hemispherical, as shown, although other shapes are possible, and may be supported, for example, as shown on the light conductor, which again is a waveguide rod 40, or an outer tubular waveguide shell 73. Similarly, the support element 20 could be shaped other than as a flat plate. The light emitter may be spherical as shown, with its upper hemisphere above the reflector 102 being either translucent or opaque; for example, it could be made from stainless steel. The light emitter may be provided with a handle 81, conveniently extending as shown from its upper hemisphere, to enable the user to adjust its position. As in the previous embodiment, the light emitter 100 may be arranged as shown at the conjugate distance from the object plane defined by the end of the waveguide rod 40 so as to project an image onto the target plane 202.

In alternative embodiments, the lighting device may comprise a plurality of interchangeable light emitters, each of which has different optical properties. For example, different light emitters may have differently shaped lenses or reflectors to change the focal length or other parameters of the optical system. Different ones of the transparent bodies may be more or less transparent or diffusive (for example, having a clouded body, incorporating refractive or reflective particles, having a frosted surface, or the like). Different ones of the reflectors may be respectively specular and Lambertian. The user may selectively interchange the light emitter so as to change the optical properties of the lighting device. In general, any of the above described embodiments may be provided in this manner with a plurality of interchangeable light emitters. Where the light emitter is mounted in a circular aperture in a support element, the light emitter may be simply lifted out of the aperture and replaced with another light emitter to provide the required effect.

In summary, a preferred lighting device comprises a light emitter with a spherical translucent body containing at least one reflector and defining large, combined incident and emission lenses. The light emitter reflects and focuses light from a waveguide to project a beam onto a target surface. The light emitter is preferably slidably mounted for rotation on a support element which may comprise a circular aperture in a plate, and may be configured as a desk or stage lamp, a wall light, or a downlighter suspended beneath a ceiling. The waveguide or light emitter may provide ambient or uplighting in addition to the beam.

It should be understood that in general, the various features described herein may be combined in any desired combination not limited to those shown in the illustrated embodiments.

In embodiments where a solid waveguide rod is used as the light conductor to convey light from the light source to the light emitter, the shape and dimensions of the conductor may be selected to produce in the emitted beam a pattern of concentric rings associated with integer reflections within the waveguide; this effect might utilised in eg aesthetic uplighting by lighting systems using waveguide rod illuminators.

In yet further alternative embodiments, the translucent body of the light emitter need not be entirely spherical. It could include a spherically or non-spherically curved surface, either forming the incident surface or any other part of the light emitter, which is slidably mounted for rotation on the light conductor or other support element so as to provide rotation with one or more degrees of freedom. For example, the light emitter could be hemispherical, or could be cylindrical and mounted for rotation in a rectangular aperture in a support element. In each case, a translucent bearing material may be arranged to conduct light from the light conductor to the translucent body.

The or each reflector is preferably fixed in relation to the translucent body of the light emitter, although an adjustable mounting could be provided if required. In further alternative embodiments, the reflector or reflectors could be arranged externally of the translucent body, for example, as a surface coating or a solid shell or mirrored plate.

In each of its embodiments, where greater intensity of illumination is required, the lighting device may include a compound light source comprising a plurality of high intensity or point light sources such as light emitting diodes, and a plurality of individual light conductors, each conveying the light emitted from a respective one or ones of the multiple light sources. Optionally, the plurality of light conductors may be bundled together to conduct light to the light emitter, or may conduct light to one or more principal light conductors, arranged for example as shown in any of the illustrated embodiments, which in turn conduct(s) the light received from all of the multiple light conductors to the light emitter. The multiple light sources could be arranged for example in a base of the lighting device, with the multiple light conductors being arranged as optical fibres or bars and converging to the base of the or each principal light conductor, which extends upwardly to the light emitter.

Further possible adaptations within the scope of the claims will be apparent to those skilled in the art.

The invention claimed is:

1. A lighting device including: at least one light emitter, at least one light source, and at least one light conductor arranged to conduct light from the light source to the light emitter;
    the light emitter including a translucent body and a first reflector, the first reflector being connected to or integral with the translucent body;
    the translucent body including a first emitter portion, a first incident portion, and a spherically curved surface, the spherically curved surface defining a first emitter lens of the first emitter portion and a first incident lens of the first incident portion;
    the first incident portion being arranged to conduct light emitted from an emission surface of the light conductor, via the first incident lens, to the first reflector;
    the first reflector being arranged to reflect the light emitted from the emission surface of the light conductor to exit the light emitter as a beam of light via the first emitter lens;
    wherein the light emitter is rotatable with at least two degrees of freedom relative to the light conductor to direct the beam; and
    wherein the light emitter is spaced apart from the light conductor to define a separation distance (S) between the emission surface and the first incident lens, the separation distance (S) being selected relative to a distance between the light emitter and a target surface so that the first incident lens and first emitter lens form a conjugate imaging system with a target plane at the target surface and an object plane at the emission surface of the light conductor; and wherein either
    (i) an object is arranged between the light conductor and the light emitter, and the lighting device is arranged to project an image of the object onto the target surface, or
    (ii) the light conductor has a cross section which defines a cross sectional shape of the beam, and the lighting device is arranged to project a correspondingly shaped, sharply defined pool of light onto the target surface; and
    wherein either
    (i) an adjustment means is provided for varying the separation distance (S), or
    (ii) a variable focus optical element is arranged between the first incident lens and the object plane at the emission surface.

2. A lighting device according to claim 1, wherein said object is arranged between the light conductor and the light emitter, and the lighting device is arranged to project said image of the object onto the target surface.

3. A lighting device according to claim 1, wherein the light conductor has said cross section which defines said cross sectional shape of the beam, and the lighting device is arranged to project said correspondingly shaped, sharply defined pool of light onto the target surface.

4. A lighting device according to claim 3, wherein the cross section is a non-circular cross section.

5. A lighting device according to claim 1, wherein
    (i) said object is arranged between the light conductor and the light emitter, and the lighting device is arranged to project said image of the object onto the target surface, and
    (ii) the light conductor has said cross section which defines said cross sectional shape of the beam, and the lighting device is arranged to project said correspondingly shaped, sharply defined pool of light onto the target surface.

6. A lighting device according to claim 5, wherein the cross section is a non-circular cross section.

7. A lighting device according to claim 1, wherein the first emitter lens defines a first emitter axis, and the first emitter lens extends over at least most of a total section area of the light emitter normal to the first emitter axis when viewed along the first emitter axis.

8. A lighting device according to claim 1, wherein the first incident lens defines a first incident axis, and the first incident lens extends over at least most of a total section area of the light emitter normal to the first incident axis when viewed along the first incident axis.

9. A lighting device according to claim 1, wherein the lighting device includes at least one support element,
    and the curved surface of the translucent body is slidably mounted on the support element to support the light emitter in rotation with said at least two degrees of freedom relative to the support element.

10. A lighting device according to claim 9, wherein the support element comprises the light conductor.

11. A lighting device according to claim 1, wherein the first reflector is located within the translucent body.

12. A lighting device according to claim 1, wherein the translucent body is spherical.

13. A lighting device according to claim 1, wherein the light conductor is a body of solid translucent material.

14. A lighting device according to claim 1, wherein an outer tubular waveguide shell is arranged around the light conductor to conduct a portion of the light from the light source.

15. A lighting device according to claim 1, wherein the lighting device includes a base and the light source is arranged at the base, and in a normal use position the light conductor extends vertically upwardly from the base and the light emitter is supported above an upper end of the light conductor.

16. A lighting device according to claim 1, wherein the cross section is a non-circular cross section.

* * * * *